US009346374B2

(12) United States Patent
Sayama et al.

(10) Patent No.: US 9,346,374 B2
(45) Date of Patent: May 24, 2016

(54) LATCHING DEVICE FOR VEHICLES

(75) Inventors: Tatsuo Sayama, Tochigi (JP); Yutaka Kizawa, Tochigi (JP)

(73) Assignee: TS TECH CO., LTD., Saitama (JP)

( * ) Notice: Subject to any disclaimer, the term of this patent is extended or adjusted under 35 U.S.C. 154(b) by 236 days.

(21) Appl. No.: 14/125,708

(22) PCT Filed: Jun. 11, 2012

(86) PCT No.: PCT/JP2012/064895
§ 371 (c)(1),
(2), (4) Date: Dec. 12, 2013

(87) PCT Pub. No.: WO2012/173084
PCT Pub. Date: Dec. 20, 2012

(65) Prior Publication Data
US 2014/0145057 A1    May 29, 2014

(30) Foreign Application Priority Data

Jun. 17, 2011    (JP) ................................. 2011-135679

(51) Int. Cl.
*B60N 2/015*    (2006.01)
*B60N 2/22*    (2006.01)
*B60N 2/36*    (2006.01)

(52) U.S. Cl.
CPC .......... *B60N 2/01508* (2013.01); *B60N 2/2245* (2013.01); *B60N 2/366* (2013.01)

(58) Field of Classification Search
CPC ........................ B60N 2/01508; B60N 2/2245
See application file for complete search history.

(56) References Cited

U.S. PATENT DOCUMENTS

| 6,168,215 | B1 * | 1/2001 | Kodama | E05B 81/06 292/201 |
| 6,733,078 | B1 * | 5/2004 | Zelmanov | B60V 2/2245 292/201 |
| 2010/0259061 | A1 * | 10/2010 | Paing | B60N 2/01583 296/65.03 |
| 2011/0169315 | A1 * | 7/2011 | Heeg | B60N 2/2245 297/378.12 |
| 2013/0307307 | A1 * | 11/2013 | Muller | B60N 2/2245 297/354.12 |
| 2015/0061349 | A1 * | 3/2015 | Handl | B60N 2/366 297/463.1 |

FOREIGN PATENT DOCUMENTS

| JP | 63-78977 | 4/1988 |
| JP | 2-74473 | 6/1990 |
| JP | 8-185845 | 7/1996 |

(Continued)

OTHER PUBLICATIONS

Decision of Refusal issued in counterpart Japanese Patent Application No. 2011-135678 on May 12, 2015 (3 pages) and English translation (3 pages).

*Primary Examiner* — Gary Hoge
(74) *Attorney, Agent, or Firm* — Hamre, Schumann, Mueller & Larson, P.C.

(57) ABSTRACT

A latching device (1) for vehicles capable of engaging with and disengaging from a rod-like portion (P1) to lock and unlock the latching device (1) includes: a casing (2) at least partly formed by a first member made of a first material and having an insertion groove (2A) for allowing the rod-like portion to be inserted thereinto; and a second member (latch (30) or reinforcement plate (20)) made of a second material and configured to contact the rod-like portion (P1). The second material has a higher specific gravity and a higher modulus of elasticity than the first material. For example, the first material is resin, whereas the second material is metal.

17 Claims, 15 Drawing Sheets

(56) References Cited

FOREIGN PATENT DOCUMENTS

| JP | 2003-299541 | | | 10/2003 |
|----|----|----|----|----|
| JP | 2005263109 | A | * | 9/2005 |
| JP | 2007-270573 | | | 10/2007 |
| JP | 2007270573 | A | * | 10/2007 |
| JP | 4318213 | | | 8/2009 |

* cited by examiner

LATCHING DEVICE FOR VEHICLES

TECHNICAL FIELD

The present invention relates to a latching device, in particular to a latching device for use in fastening a vehicle component.

BACKGROUND ART

In general, a seat rotatably provided on a vehicle body includes a latching device at its leg or another part, and the seat is fastened to the vehicle body by the engagement of the latching device with a striker fixed to the vehicle body. This latching device is configured, as disclosed in Patent Literature 1 for example, such that rotating parts such as a latch and a ratchet are supported in a base plate. Generally, the base plate, the latch and the ratchet used for the latching device for vehicles are made of steel material.

CITATION LIST

Patent Literatures

Patent Literature 1: Japanese Patent No. 4318213

SUMMARY OF INVENTION

Technical Problem

However, if the latch, the ratchet and the casing for receiving them are made of the same material, namely steel material, the latching device will be too heavy On the other hand, reducing the weight of the latching device will result in insufficient durability or insufficient rigidity of each of the constituent parts.

Further, there is also a problem that metallic sound occurs when the latch and the ratchet which are made of steel contact the casing made of steel. This metallic sound occurs not only by operating the latching device but also by vibration of the vehicle body, and in some places where the latching device is provided such a metallic sound may not be preferable.

Further, to assemble the latching device, it is preferable to improve the productivity. To this end, reducing the number of constituent parts of the latching device and simplifying the assembly of the latching device are desired.

In view of the above-described background, the present invention seeks to provide a latching device for vehicles, of which the weight can be reduced.

The present invention also seeks to provide a latching device, which can ensure the durability and the rigidity even if the weight thereof is reduced.

Further, the present invention seeks to provide a latching device for vehicles, in which metal-to-metal contact is reduced to provide a preferable operating feel.

The present invention further seeks to improve the productivity of the latching device for vehicles.

Solution to Problem

According to the present invention which solves the above problem, there is provided a latching device for vehicles capable of engaging with and disengaging from a rod-like portion to lock and unlock the latching device, the latching device comprising: a casing at least partly formed by a first member made of a first material and having an insertion groove for allowing, the rod-like portion to be inserted thereinto and a second member made of a second material and configured to contact the rod-like portion, wherein the second material has a higher specific gravity and a higher modulus of elasticity than the first material.

With this configuration of the latching device for vehicles, since at least part of the casing is formed by the first material having a lower specific gravity and a lower modulus of elasticity than the second member configured to contact the rod-like portion, the weight of the latching device can be reduced as compared to the configuration in which the casing is made of the second member only.

Preferably, the above-described latching device for vehicles comprises a latch received in and rotatably supported by the casing and having a hook-like portion engageable with the rod-like portion, and the second member is the hook-like portion of the latch.

With this configuration of the latching device for vehicles, since the casing is made of a material (e.g., resin) having a lower specific gravity and a lower modulus of elasticity than the steel material constituting the hook-like member of the latch, metal-to-metal contact can be reduced and a preferable operating feel can be obtained.

In the above-described latching device for vehicles, it is preferable that the first material is resin and the first member forms a resinous casing, and the second member forms a reinforcement plate configured to reinforce the resinous casing.

With this configuration of the latching device for vehicles, since the resinous casing is reinforced by the reinforcement plate having a higher specific gravity and a higher modulus of elasticity, the weight of the latching device for vehicles can be reduced while ensuring the durability and the rigidity of the casing.

In the above-described latching device for vehicles, it is preferable that the first material is resin and the first member forms a resinous casing, and the second material is metal.

With this configuration of the latching device for vehicles, since the casing, for supporting the latch containing a metallic portion is made of resin, and contacting of the inner wall of the casing and side surfaces of the latch (end faces located on both ends of the axis of rotation) does not involve metal-to-metal contact, it is possible to eliminate metallic sound and to obtain a smooth operating feel.

Preferably, the above-described latching device for vehicles further comprises a latch received in and rotatably supported by the casing and having a hook-like portion engageable with the rod-like portion, and the casing comprises the first member and the second member, and the insertion groove is formed in the second member.

With this configuration of the latching device for vehicles, since the casing comprises the first member made of the first material and the second member made of the second material having a higher specific gravity and a higher modulus of elasticity than the first material, the weight of the latching device can be reduced as compared to the configuration in which the casing is made of the second material only. Further, if the casing is made of the first material only, the rigidity of the casing may be insufficient. However, use of the second material can ensure the rigidity of the casing. Further, since the insertion groove is formed at least by the second member, the durability of the insertion groove can be ensured.

In the above-described latching device for vehicles, it is preferable that the first member has an integrally-formed first shaft which protrudes inward of the casing and is shaped as a circular tube, that the latch has a first hole through which the latch is fitted onto the first shaft, and the latch is rotatably supported by the first member by an engagement of the first shaft and the first hole, and that the latching device further comprises a first fixing member configured to penetrate through an inner region of a tube of the first shaft and fix the latching device to another device.

With this configuration of the latching device for vehicles, the first fixing member is inserted into the circular tubular first shaft formed on the first member, with the result that the rigidity of the first shaft can be enhanced.

Preferably, the above-described latching device for vehicles further comprises ratchet received in the casing and rotatably supported by the first member and configured to engage with the latch to maintain a closed state in which the latch is engageable with the rod-like portion and an open state in which the latch is disengageable from the rod-like portion, and it is preferable that the first member has an integrally-formed second shaft which protrudes inward of the casing and is shaped as a circular tube, that the ratchet has a second hole through which the ratchet is fitted onto the second shaft, and the ratchet is rotatably supported by the first member by an engagement of the second shaft and the second hole, and that the latching device further comprises a second fixing member configured to penetrate through an inner region of a tube of the second shaft and fix the latching device to another device.

With this configuration of the latching device for vehicles, the second fixing member is inserted into the circular tubular second shaft formed on the first member, with the result that the rigidity of the second shaft can be enhanced.

Preferably, the above-described latching device for vehicles further comprises a ratchet received in the casing and rotatably supported by the first member and configured to engage with the latch to maintain a closed state in which the latch is engageable with the rod-like portion and an open state in which the latch is disengageable from the rod-like portion, and it is preferable that the first member has an integrally-formed second shaft which protrudes inward of the casing and is shaped as a circular tube, that the ratchet has a second hole through which the ratchet is fitted onto the second shaft, and the ratchet is rotatably supported by the first member by an engagement of the second shaft and the second hole, that the latching device further comprises a second fixing member configured to penetrate through an inner region of a tube of the second shaft and fix the latching device to another device, and that as viewed from a direction in which a load is applied from the rod-like portion, a load-receiving portion configured to receive a load from the rod-like portion is provided between the first fixing member and the second fixing member.

With this configuration of the latching device for vehicles, a force received by the load-receiving portion is supported in good balance by the first fixing member and the second fixing member, with the result that an unnecessary rotation moment does not occur in the latching device for vehicles.

Preferably, the above-described latching device for vehicles further comprises a resinous load-receiving member having a load-receiving portion configured to receive a load from the rod-like portion, and it is preferable that the first member is made of resin and has an engagement hole engageable with the load-receiving member, that the second member is made of sheet metal and has a support portion configured to support a force applied from the rod-like portion and received by the load-receiving member, and that the load-receiving member is configured to hold the second member and has an engagement projection engageable with the engagement hole of the first member.

With this configuration of the latching device for vehicles, the load-receiving member is configured to hold the second member and engage with the second member to transmit a load to the support portion of the second member. Further, the load-receiving member is fixed by the engagement of the engagement projection of the load-receiving member and the engagement hole of the first member. With this configuration, it is not necessary to provide the engagement hole in the second member and instead the engagement hole is provided in the resinous first member, which can ease the manufacture.

Preferably, the above-described latching device for vehicles further comprises a ratchet received in the casing and rotatably supported by the first member and configured to engage with the latch to maintain a closed state in which the latch is engageable with the rod-like portion and an open state in which the latch is disengageable from the rod-like portion, and it is preferable that the first member has an integrally-formed second shaft which protrudes inward of the casing and is shaped as a circular tube, that the ratchet has a second hole through which the ratchet is fitted onto the second shaft, and the ratchet is rotatably supported by the casing by an engagement of the second shaft and the second hole, that the latching device further comprises a second fixing member configured to penetrate through an inner region of a tube of the second shaft and fix the latching device to another device, that the first member has holes for allowing the first fixing member and the second fixing member to penetrate therethrough, and a fringe of each hole is provided with a positioning projection extending outward from the first member, and that the second member has positioning holes fitted onto the corresponding positioning projections.

With this configuration of the latching device for vehicles, the positioning projection is provided at the fringe of the hole through which the first fixing member passes and at the fringe of the hole through which the second fixing member passes, and this can provide a simple configuration as compared to the configuration in which positioning projections and corresponding holes are provided in other positions. Further, the positioning projections and the positioning holes can be engaged with each other without fail.

In the above-described latching device for vehicles, it is preferable that the support portion is provided at a recess portion of a contour of the second member.

With this configuration of the latching device for vehicles, the second member can be downsized and an efficient cutting layout for the second member can be achieved.

In the above-described latching device for vehicles, it is preferable that the first member constitutes a wall of the casing located at one side in a direction of an axis of rotation of the latch, and the second member constitutes at least an outer side of a wall of the casing located at the other side, and that the second member is located outside when the latching device is attached to another device by a fixing member, and serves as a bearing surface for receiving a fixing force of the fixing member.

With this configuration of the latching device for vehicles, since the second member is located outside, the second member can directly receive a force required for fixing the latching device and the second member can protect the first member from an external impact.

In the above-described latching device for vehicles, it is preferable that the resinous casing is formed as a box-like shape by assembling two members together, and the two members are molded together with a hinge connecting the two members.

With this configuration of the latching device for vehicles, if two members constituting the resinous casing are connected by a hinge and molded together, the two members can be formed at one time. This can reduce the cost, and an excellent productivity can be achieved by instantly assembling the two members into a box-like shape without paying attention to the orientation of the two members.

In the above-described latching device for vehicles, it is preferable that the resinous casing has an integrally-formed first shaft which protrudes inward of the resinous casing, that the latch has a first hole through which the latch is fitted onto the first shaft, and the latch is rotatably supported by the resinous casing by an engagement of the first shaft and the first hole.

With this configuration of the latching device for vehicles, since the latch is supported at its first hole by the first shaft of the resinous casing, it is possible to further reduce metallic sound and to obtain a smoother operating feel.

Preferably, the above-described latching device for vehicles further comprises a metal ratchet received in and rotatably supported by the resinous casing and configured to engage with the latch to maintain a closed state in which the latch is engageable with the rod-like portion and an open state in which the latch is disengageable from the rod-like portion, and it is preferable that the casing has an integrally-formed second shaft which protrudes inward of the casing, and that the ratchet has a second hole through which the ratchet is fitted onto the second shaft, and the ratchet is rotatably supported by the casing by an engagement of the second shaft and the second hole.

With this configuration of the latching device for vehicles, since the ratchet is supported at its second hole by the second shaft of the resinous casing, it is possible to further reduce metallic sound and to obtain a smoother operating feel.

In the above-described latching device for vehicles, it is preferable that the first shaft is shaped as a circular tube, and that the latching device further comprises a first fixing member made of metal and configured to penetrate through an inner region of a tube of the first shaft and fix the latching device to another device. As an alternative, it is preferable that the second shaft is shaped as a circular tube, and that the latching device further comprises a second fixing member made of metal and configured to penetrate through an inner region of a tube of the second shaft and fix the latching device to another device.

In the configuration in which the latch and the ratchet are supported by shafts made of resin, if the resinous shafts are shaped as a circular hollow tube, the rigidity of the shafts may be decreased. However, with the configuration of the above-described latching device for vehicles, since the fixing member penetrates through the inner region of the corresponding shaft, the rigidity of the shaft can be enhanced. Further, since a part used for fixing the latching device also serves to reinforce the shaft, the number of constituent parts can be decreased as compared to the configuration which another reinforcing part is provided separately. Further, since the shaft can be formed to have a thickness substantially the same as that of the casing, molding can be performed with increased accuracy.

In the above-described latching device for vehicles, it is preferable that the resinous casing has a first rib provided around the first shaft and protruding inward of the resinous casing.

With this configuration of the latching device for vehicles, since the contacting area between the casing and the latch or the ratchet can be reduced by providing the first rib inside the casing, a smoother operating feel can be obtained.

Preferably, the above-described latching device for vehicles further comprises: a metal ratchet received in and rotatably supported by the resinous casing and configured to engage with the latch to maintain a closed state in which the latch is engageable with the rod-like portion and an open state in which the latch is disengageable from the rod-like portion; a lever member made of metal and rotatably supported by the latch and configured to engage with the ratchet to transmit a motion of the ratchet to the latch; and an urging, member configured to engage with the lever member and with the ratchet, and it is preferable that the resinous casing has an integrally-formed second shaft which protrudes inward of the resinous casing, that the ratchet has a second hole through which the ratchet is fitted onto the second shaft, and a flange provided around the second hole and protruding in an axial direction of the second hole, that the ratchet is rotatably supported by the resinous casing by an engagement of the second shaft and the second hole, and that the lever member is urged by an urging force of the urging member and contacts the flange when the latch is in the closed state.

In the configuration in which the ratchet is supported by the shaft made of resin, if the lever member is brought into contact with the resinous shaft to prevent a play of the lever member, the resinous shaft may wear out. However, with the configuration of the above-described latching device for vehicles, since the flange is provided around the second hole of the ratchet so as to protrude in an axial direction of the hole, and the lever member is brought into contact with this flange, even if the resinous shaft is used, it is possible to prevent play of the lever member as well as to prevent wear of the resin.

DESCRIPTION OF EMBODIMENTS

Hereafter, a description will be given of one embodiment of a latching device for vehicles according to the present invention with reference to the drawings. As seen FIG. 1, a latching device 1 for vehicles according to one embodiment is provided, for example, at a frame S of a vehicle seat of an automobile as an example of another device, especially at a side frame S1 constituting a seat back. As an example, a bracket S2 made by sheet-metal working is welded to the side frame S1, and the latching device 1 is fastened by bolts 90 to weld nuts WN which is fixed to the bracket S2. The bolts 90 are an example of first and second fixing members.

Figure 1:
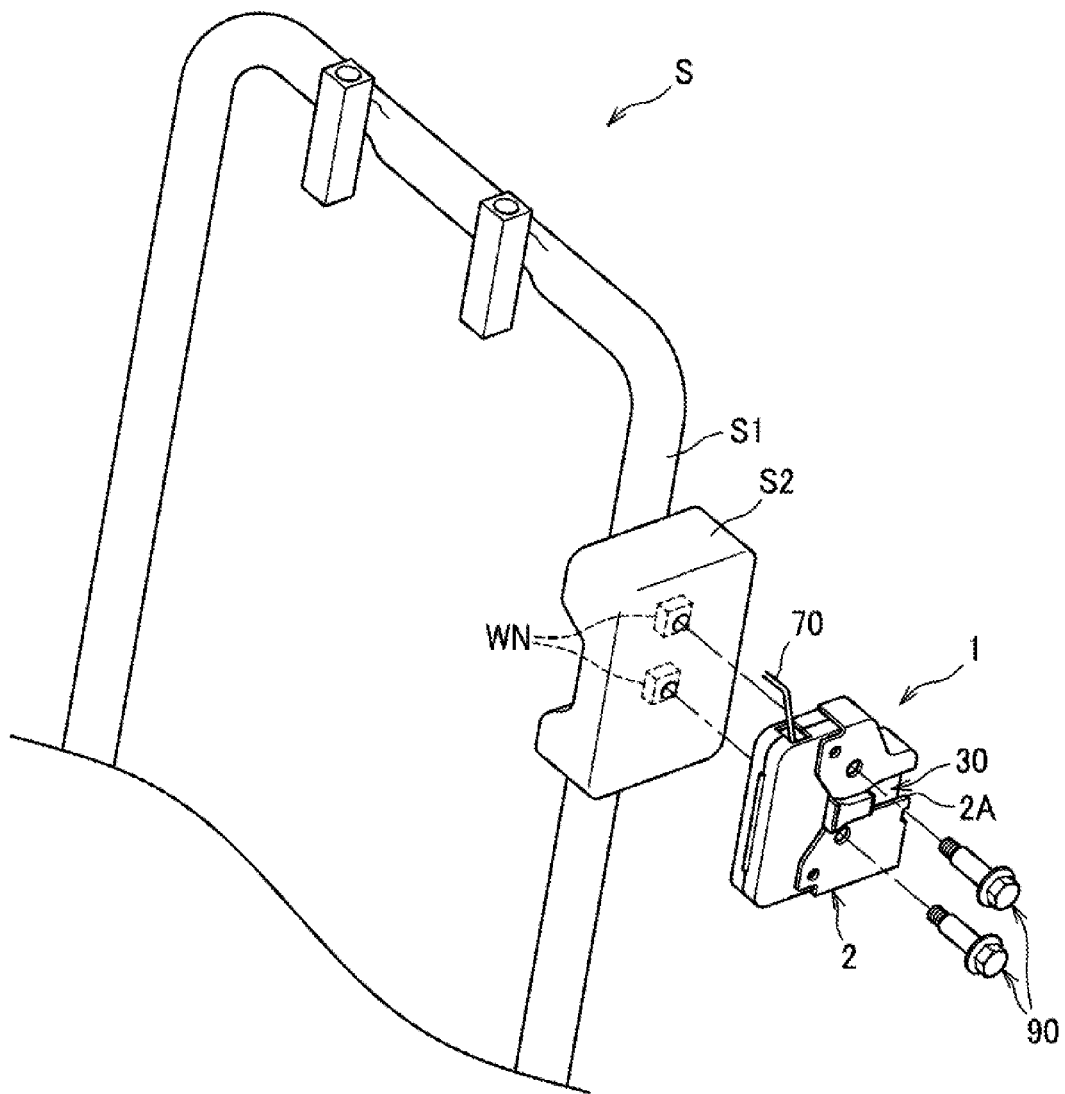
FIG. 1 is a perspective view of a seat frame of a vehicle seat provided with a latching device for vehicles.

The latching device 1 includes a casing 2 in which mechanism elements such as a latch 30 are received. An insertion groove 2A which opens rightward in FIG. 1 is formed in the casing 2, and the latch 30 comes in a closed state or an open state by advancing or retreating a hook-like portion of the latch 30 into or away from the insertion groove 2A. While the latch 30 is opened in an unlocked state, the latching device 1 is capable of locking a rod-like portion of a striker (see FIG. 6) fastened to a vehicle body by moving and pressing the latching device 1 against the rod-like portion. Further, as described later, the latching device 1 is capable of unlocking the rod-like portion by pulling out a rod 7 to operate the latch 30 from the closed state into the open state.

Figure 2:
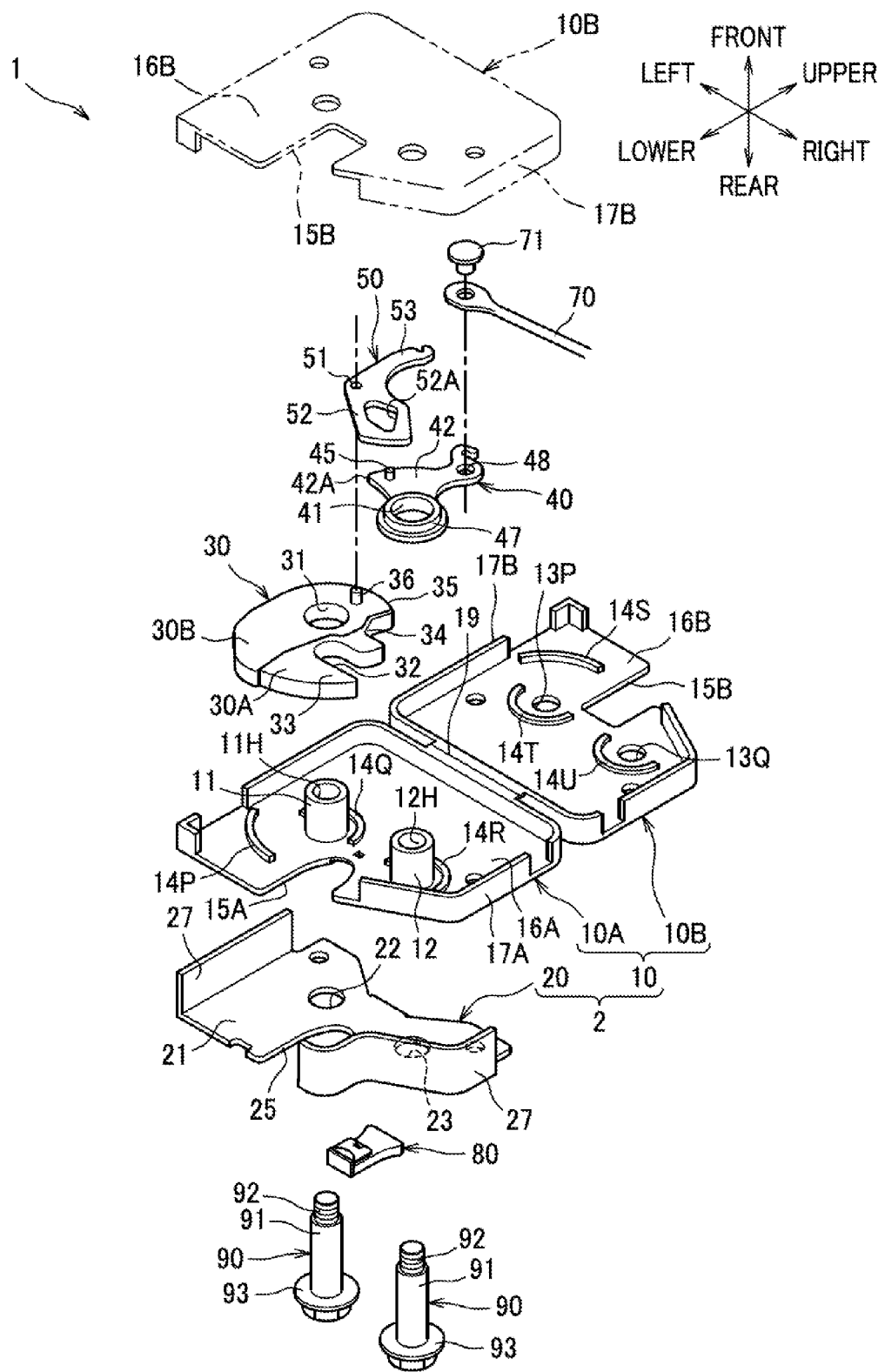
FIG. 2 is an exploded perspective view of the latching device.

As seen in FIG. 2, the latching device 1 mainly includes a casing 2, a latch 30, a ratchet 40, a lever member 50, a rod 70, and a load-receiving member 80. In the following description of the configuration of the latching device 1, directions of upper, lower, right, left, front and rear thereof are referred to for convenience as those shown by arrows in FIG. 2; it is however to be understood that the latching device 1 can be used in any orientation.

The casing 2 includes a resinous casing 10 (first member) made of resin as an example of a first material, and a reinforcement plate 20 (second member) made by sheet-metal working of a steel plate as an example of a second material which has a higher specific gravity than the resin and also has a higher modulus of elasticity and thus more robust than the resin. In general, a latching device for vehicles used for a vehicle is robust and is configured such that various components including a latch made of steel are supported on a base made of metal such as a steel plate; these parts are very heavy. In contrast, according to the latching device 1 in this embodiment, use of the resinous casing 10 can greatly reduce the weight of the latching device 2 while ensuring the necessary rigidity and strength by partly providing the reinforcement plate 20.

The resinous casing 10 includes a lower case 10A in the shape of a tray having an open side and an upper case 10B in the shape of a tray having an open side, which are formed together while being connected by a hinge 19 made as a thin wall portion. This resinous casing 10 can be made by integral molding using, a set of molds. The upper case 10B is rotatable around the hinge 19 with respect to the lower case 10A; the upper case 10B and the lower case 10A form a box-like shape when they are closed together by mating the open side of the upper case 10B and the open side of the lower case 10A.

The lower case 10A is shaped like a tray and includes a flat-plate-shaped base portion 16A and side wall portions 17A provided by partly rising at outer edges of the base portion. 16A. An insertion groove 15A corresponding to the insertion groove 2A is formed at a lower edge of the base portion 16A. Further, circular tubular first and second shafts 11, 12 protrude inward from the base portion 16A at positions on both right and left sides of the insertion groove 15A and slightly upwardly away from the insertion groove 15A. The first shaft 11 and the second shaft 12 are integral with the base portion 16A.

The first shaft 11 has a bolt hole 11H extending in the axial direction of the first shaft 11 and formed as a through-opening having a circular cross-section. The second shaft 12 also has a bolt hole 12H extending in the axial direction of the second shaft 12 and formed as a through-opening having a circular cross-section. The bolt holes 11H, 12H have a diameter substantially the same as that of a shank 91 of a bolt 90.

Figure 3:
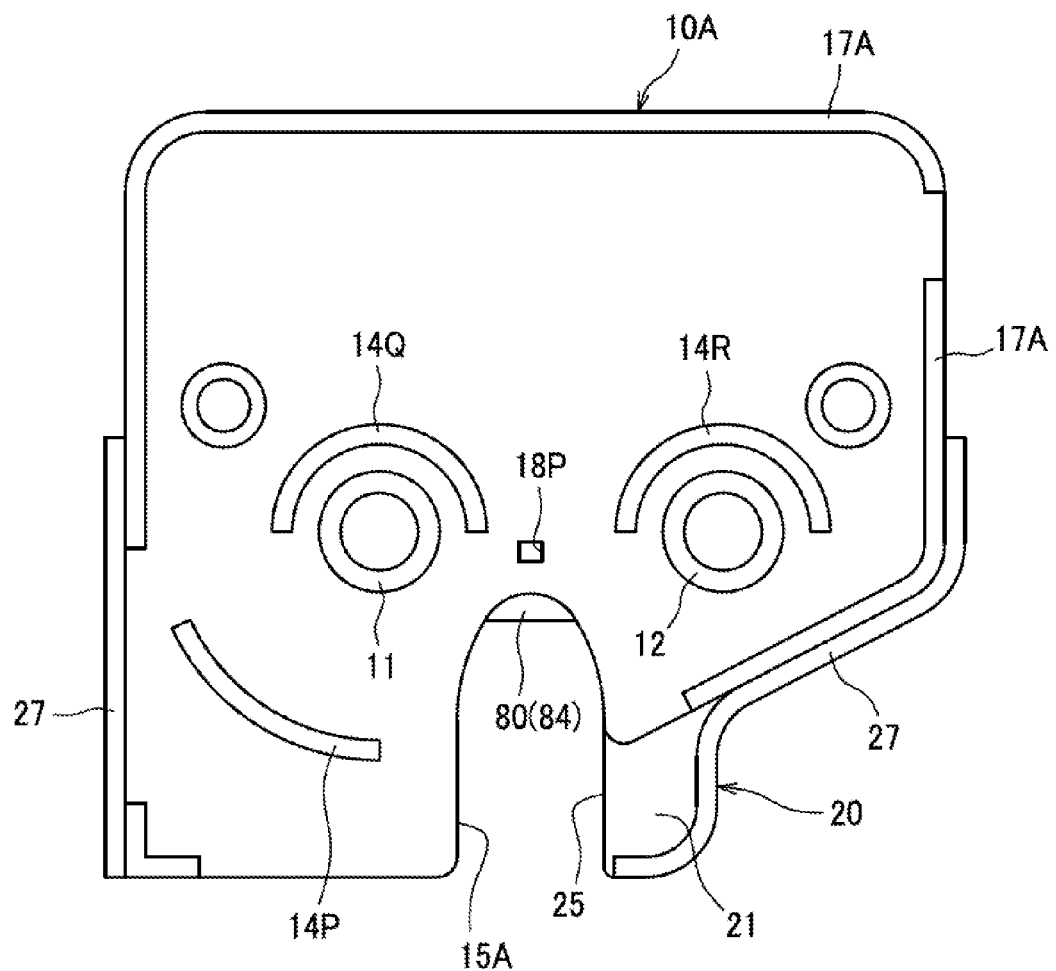
FIG. 3 is a top view of a reinforcement plate and a lower case as viewed from inside.

Provided on the base portion 16A around the first shaft 11 are two first ribs 14P, 14Q each shaped as a circular arc coaxial with the first shaft 11 and protruding inward of the resinous casing 10 (see also FIG. 3). The first ribs 14P, 14Q are provided at positions corresponding to a movable range of the latch 30. Provided on the base portion 16A around the second shaft 12 is a second rib 14R shaped as a circular arc coaxial with the second shaft 12 and protruding inward of the resinous casing 10 (see also FIG. 3). The second rib 14R is provided at a position corresponding to a movable range of the ratchet 40.

As seen in FIG. 5(a), positioning projections 11J, 12J are provided at an outer side of the lower case 10A at fringes of the bolt holes 11H, 12H so as to position the reinforcement plate 20 with respect to the upper, lower, right and left directions of the lower case WA. Further, a recess portion 18 is formed at a fringe of the bottom of the insertion groove 15A, which recess portion 18 is recessed from the other outer surface as it is formed to have a thin wall, and at an upper end portion of the recess portion 18 there is provided an engagement hole 18P which penetrates through the base portion 16A.

The upper case 10B has an inner structure substantially the same as and symmetrical with that of the lower case 10A around the hinge 19, except that the upper case 10B does not have the first shaft 11 and the second shaft 12. As seen in FIG. 2, the upper case 10B is shaped like a tray and includes a flat-plate-shaped base portion 16B and side wall portions 17B provided by partly rising at outer edges of the base portion 16B. An insertion groove 15B corresponding to the insertion groove 2A is formed, at an upper edge (lower edge after assembly) of the base portion 16B. Further, bolt holes 13P, 13Q are formed in the base portion 16B corresponding to the bolt holes 11H, 12H at positions on both right and left sides of the insertion groove 15B and slightly downwardly (upwardly after assembly) away from the insertion groove 15B.

Provided on the base portion 16B around the bolt holes 13P are two first ribs 14S, 14T each shaped as a circular arc coaxial with the bolt hole 13P and protruding inward of the resinous casing 10; the first ribs 14S, 14T are arranged in symmetrical positions of the first ribs 14P, 14Q. Further, provided on the base portion 16B around the bolt hole 13Q is a second rib 14U shaped as a circular arc coaxial with the bolt hole 13Q and protruding inward of the resinous casing 10; the second rib 14U is arranged in a symmetrical position of the second rib 14R.

As seen in FIGS. 2 and 5(a), the reinforcement plate 20 is configured to cover the upper part of the outer side of the lower case 10A except a part of the upper portion of the lower case 10A, and includes a flat-plate-shaped base portion 21 and side wall portions 27 provided by partly rising inward at right and left ends of the outer edges of the base portion 21. Although not shown in detail in the figures, the side wall portions 27 of the reinforcement plate 20 are engageable with the side wall portions 17A of the lower case 10A to temporarily assemble the reinforcement plate 20 and the lower case 10A together.

The base portion 21 has positioning holes 22, 23 corresponding to the above-described positioning projections 11J, 12J of the lower case 10A and sized to be fitted onto the positioning projections 11J, 12J. Further, an insertion groove 25 corresponding to the insertion groove 2A is formed at a lower edge of the base portion 21.

As seen in FIG. 5(a), a flange 28 is provided at the outer side of the reinforcement plate 20; the upper edge of the reinforcement plate 20 is bent outward to raise the flange 28. The flange 28 is brought into contact with the load-receiving member 80 to support a force applied from the rod-like portion P1 of the striker P (see FIG. 6) and received by the load-receiving member 80. As viewed from the axial direction of the first shaft 11, namely as viewed from a direction facing the base portion 21, the flange 28 is provided at a bottom of the recess portion 29 formed at an upper part of the contour of the reinforcement plate 20. Since the flange 28 is provided using the recess portion 29 of the reinforcement plate 20, the size of the reinforcement plate 20 can be reduced and thus an efficient cutting layout for the reinforcement plate 20 can be achieved.

The latch 30 is configured to engage with and disengage from the rod-like portion P1 of the striker P to thereby lock and unlock the latching device 1. As seen in FIG. 2, the latch 30 is formed by blanking out a thick sheet metal; the latch 30 has a first hole 31 penetrating in the thickness direction, and is rotatably supported on the resinous casing 10 with the first hole 31 fitted onto the first shaft 11. To be more specific, the latch 30 includes a latch body 30A made of metal, and a cover 30B made of resin and configured to cover the latch body 30A at the front surface and a part of side edge of the latch body 30A. The cover 30B is provided to improve the sliding property of the latch 30 relative to the ratchet 40.

Figure 6:
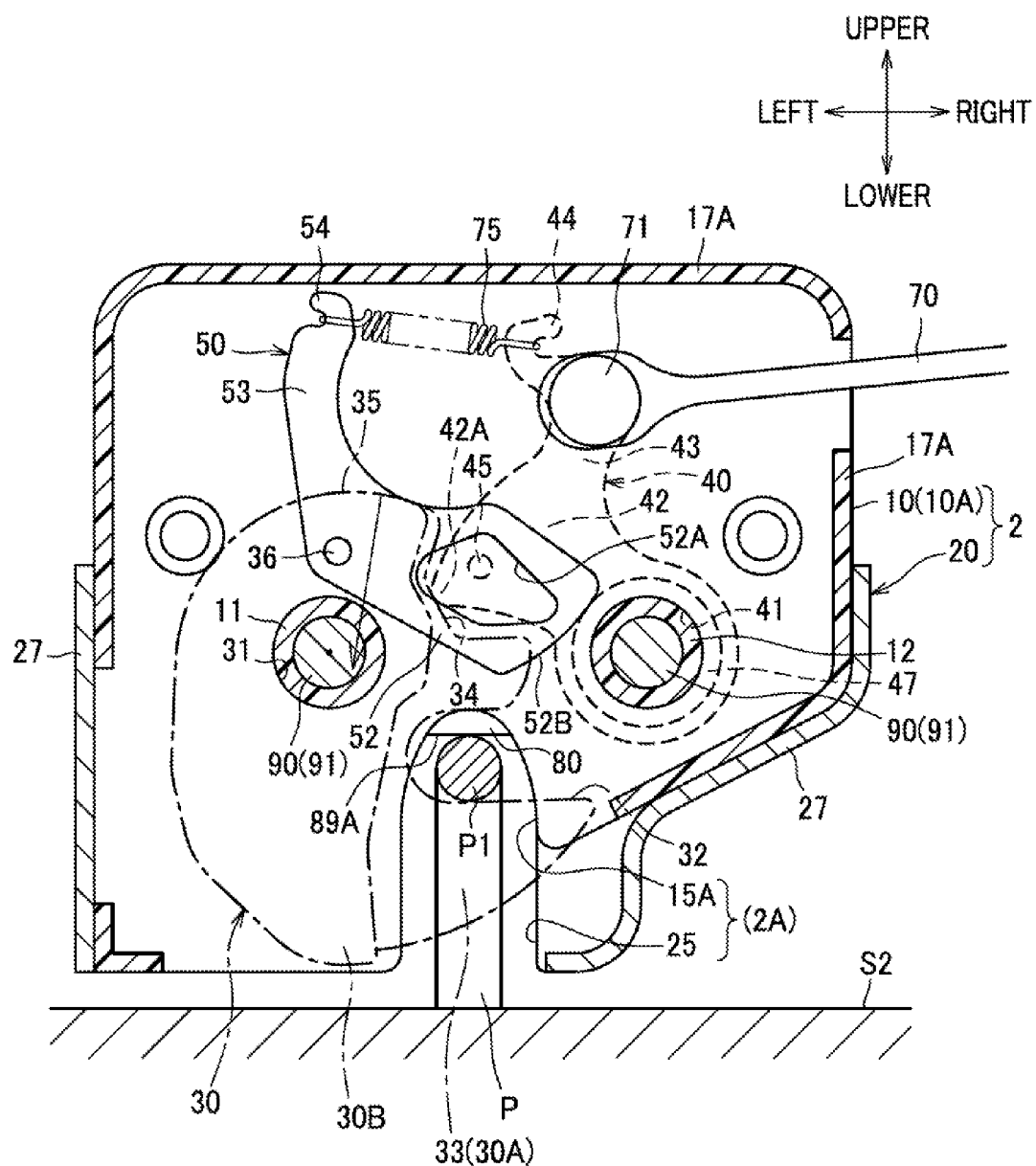
FIG. 6 is a sectional view showing the latching device in a locked state.

The latch 30 has a groove 32 engageable with the rod-like portion P1, and a portion which forms the contour of the groove 32 is formed as a hook-like portion 33. Further, in the posture of the latch 30 as shown in FIG. 6, a locking recess portion 34 is provided at the upper right edge of the latch 30; the locking recess portion 34 dents toward the first hole 31. An outer peripheral portion adjoining the left side of the locking recess portion 34 serves as an open contact surface 35 with which the ratchet 40 is in contact while the latch 30 is open, so as to maintain the open state of the latch 30. The open contact surface 35 is formed as an outwardly protruding curved surface, and in its entire region where a locking engagement portion 42A of the ratchet 40 to be described later contacts the open contact surface 35, the direction directing, from the surface of the outer periphery toward the center of the circle of curvature (see arrow of FIG. 6) is shifted to one side, that is rightward in this embodiment, with respect to the axis of rotation of the latch 30. For this reason, a force applied from the locking engagement portion 42A and received by the latch 30 acts to rotate the latch 30 in the clockwise direction, namely into the open state.

To support the lever member 50 while allowing rotation thereof, a pin 36 is press fitted into the latch 30; the pin 36 protrudes frontward from the latch 30.

The ratchet 40 is a generally plate-like member made of metal. The ratchet 40 has a second hole 41 penetrating in the thickness direction, and is rotatably supported on the resinous casing 10 with the second hole 41 fitted onto the second shaft 12 of the resinous casing 10. The axis of rotation of the ratchet 40 is parallel to the axis of rotation of the latch 30. The ratchet 40 includes a generally sector-shaped main body 42 provided at the upper left side of the second hole 41, and the lower left corner of the main body 42 contacts the latch 30 and serves as the locking engagement portion 42A. When the latch 30 is in the closed state, the locking, engagement portion 42A is located in the locking recess portion 34 to maintain the closed state of the latch 30. On the contrary, when the latch 30 is in the open state, the locking engagement portion 42A is in contact with the open contact surface 35 to maintain the open state of the latch 30.

Provided at the upper side of the main body 42 is a narrow arm 43 extending further upward, and the distal end of the arm 43 is formed as a hook 44 engageable with the right end of an extension spring 75 as an example of an urging member. Since one end of the extension spring 75 is engaged with the hook 44 which is provided by forming the distal end shape of the arm 43 into a hook-like shape, the number of constituent parts can be reduced as compared to the configuration in which the end of the extension spring 75 is fastened to the arm 43 using another part such as a rivet. Further, as seen in FIG. 2, the arm 43 has a hole 48 for connecting a rod 70 through a rivet 71 to allow the swinging motion of the rod 70; the rod. 70 is used to operate the latching device 1 from the locked state into the unlocked state.

As seen in FIG. 6, a pin 45 is press fitted into the main body 42 at a position slightly rightward from the locking engagement portion 42A; the pin 45 protrudes frontward from the main body 42 of the ratchet 40. Further, as seen in FIG. 2, the ratchet 40 has a flange 47 surrounding the second hole 41 and protruding frontward in the axial direction of the second hole 41. The flange 47 has the height corresponding to the thickness of the lever member 50; when the latch 30 is in the closed state, the lever member 50 is pulled by the urging force of the extension spring 75 and contacts the flange 47 to thereby eliminate a play of the lever member 50.

The lever member 50 is an operation mechanism for interlocking the motion of the ratchet 40 with that of the latch 30. The lever member 50 is a narrow and longitudinal plate-like member having a hole 51 at its longitudinal center portion, and is rotatably supported on the latch 30 with the hole 51 fitted onto the pin 36 of the latch 30.

The lever member 50 includes an activating arm 52 and an operating arm 53; in the posture of the lever member 50 as shown in FIG. 6, the activating arm 52 extends in the lower right direction from the axis of rotation of the lever member 50, and the operating arm 53 extends upward from the axis of rotation of the lever member 50. A guide hole 52A in a deformed rectangular shape is formed in the activating arm 52. The pin 45 of the ratchet 40 is inserted into the guide hole 52A. The distal end of the activating arm 52 is brought into contact with the flange 47 of the ratchet 40 and serves as a stopper surface 52B for eliminating a play of the lever member 50. The distal end of the operating arm 53 forms a hook 54 engageable with the left end of the extension spring 75. Since one end of the extension spring 75 is engaged with the hook 54 which is provided by forming the distal end shape of the operating arm 53 into a hook-like shape, the number of constituent parts can be reduced as compared to the configuration in which the end of the extension spring 75 is fastened to the operating arm 53 using another part such as a rivet.

For the purpose of attaching the extension spring 75, it is preferable that the hook 44 and the hook 54 are located at the same height (i.e., axial positions of the hook 44 and the hook 54 in the first shaft 11 coincide with each other). In order to adjust the hook 44 and the hook 54 to the same height, the thickness of the hook 44 may be differentiated from that of the main body 42 of the ratchet 40, or alternatively the operating arm 53 may be bent in the vicinity of the distal end of the operating arm 53 to adjust the height of the hook 54.

As described previously, the extension spring 75 has two ends which are hooked to the ratchet 40 and the lever member 50, respectively, so as to apply an urging force for always attracting the main body 42 of the ratchet 40 and the operating arm 53 of the lever member 50. This urging force also acts to apply a force for urging the locking engagement portion 42A of the ratchet 40 toward the latch 30.

Figure 4:
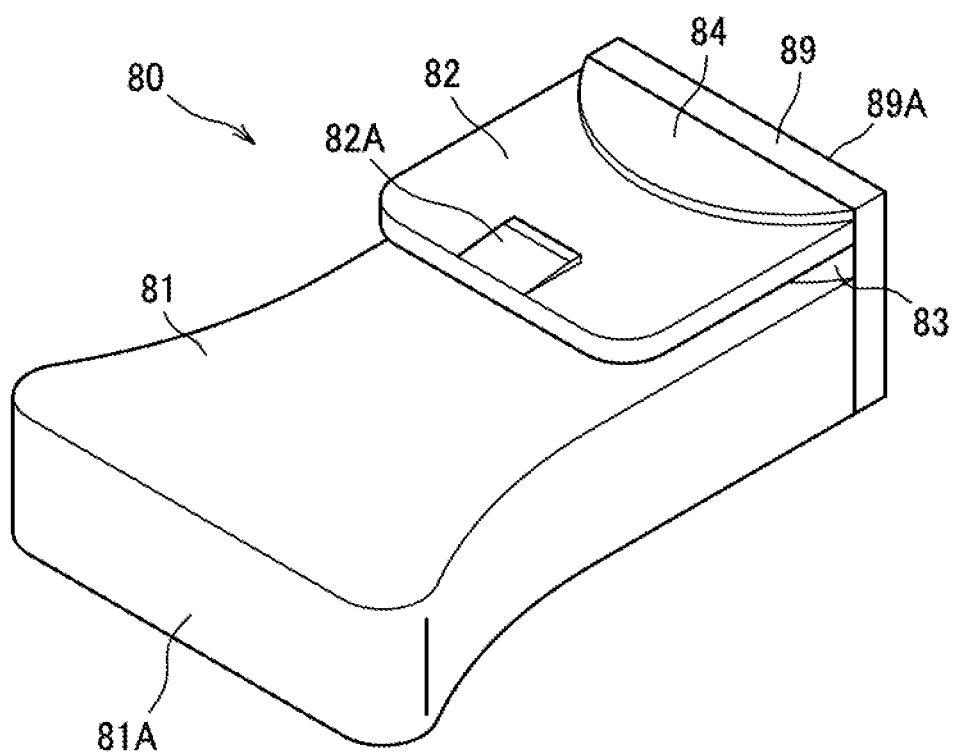
FIG. 4 is a perspective view of a load-receiving member.

The load-receiving member 80 is made of resin and configured to contact the rod-like portion P1 of the striker P and receive the load from the striker P. As seen in FIG. 4, the load-receiving member 80 mainly includes a main body 81 having a rectangular cross section broadening toward its end, and an engagement claw 82 engageable with the resinous casing 10 and the reinforcement plate 20. The end face 81A of the broadened end portion of the main body 81 contacts the flange 28 of the reinforcement plate 20 to transmit the load received from the striker P to the reinforcement plate 20. The end of the main body 81 opposite to the end face 81A is connected through the engagement claw 82 and a generally semi-circular connecting portion 83. Accordingly, as seen in FIG. 5(b), the load-receiving member 80 has a U-shaped cross-section made by the main body 81, the connecting portion 83 and the engagement claw 82.

Provided at the distal end of the engagement claw 82 is an engagement projection 82A engageable with the above-described engagement hole 18P of the lower case 10A; the engagement projection 82A protrudes from the engagement claw 82 in a direction opposite to the main body 81. Further, a generally semi-circular projection 84 which is similar to the connecting portion 83 is provided at the distal end of the engagement claw 82; the semi-circular projection 84 protrudes from the engagement claw 82 in the direction opposite to the main body 81. The semi-circular shape of the connecting portion 83 generally conforms to the shape of the bottom portion of the insertion groove 25 formed in the reinforcement plate 20, and the semi-circular shape of the projection 84 generally conforms to the shape of the bottom portion of the insertion groove 15A formed in the lower case 10A. A resin sheet 89 having an excellent sliding property is bonded to the other end face of the load-receiving member 80 opposite to the end face 81A. The surface of the resin sheet 89 is a load-receiving surface 89A as an example of a load-receiving portion which is brought into contact with the striker P. As viewed from a direction in which a load is applied from the rod-like portion P1 (i.e., direction from lower to upper in FIG. 6), the load-receiving surface 89A is located between the two bolts 90. Accordingly, a force received by the load-receiving surface 89A is supported in good balance by the two bolts 90, with the result that an unnecessary rotation moment does not occur in the latching device 1.

As seen in FIG. 5(b), when the lower case 10A and the reinforcement plate 20 are closely in contact with each other, a gap is formed between the lower case 10A and the reinforcement plate 20 because of recess portion 18 of the lower case 10A. The load-receiving member 80 is assembled by inserting the engagement claw 82 into the gap between the recess portion 18 and the reinforcement plate 20 while retaining the reinforcement plate 20 between the main body 81 and the engagement claw 82. The engagement projection 82A provided at the distal end of the engagement claw 82 enters and engages with the engagement hole 18P of the lower case 10A. Further, the end face 81A of the load-receiving member 80 is brought into contact with the flange 28 of the reinforcement plate 20, whereby the load applied from the striker P and received by the load-receiving surface 59A can be transmitted to the reinforcement plate 20.

Figure 7:
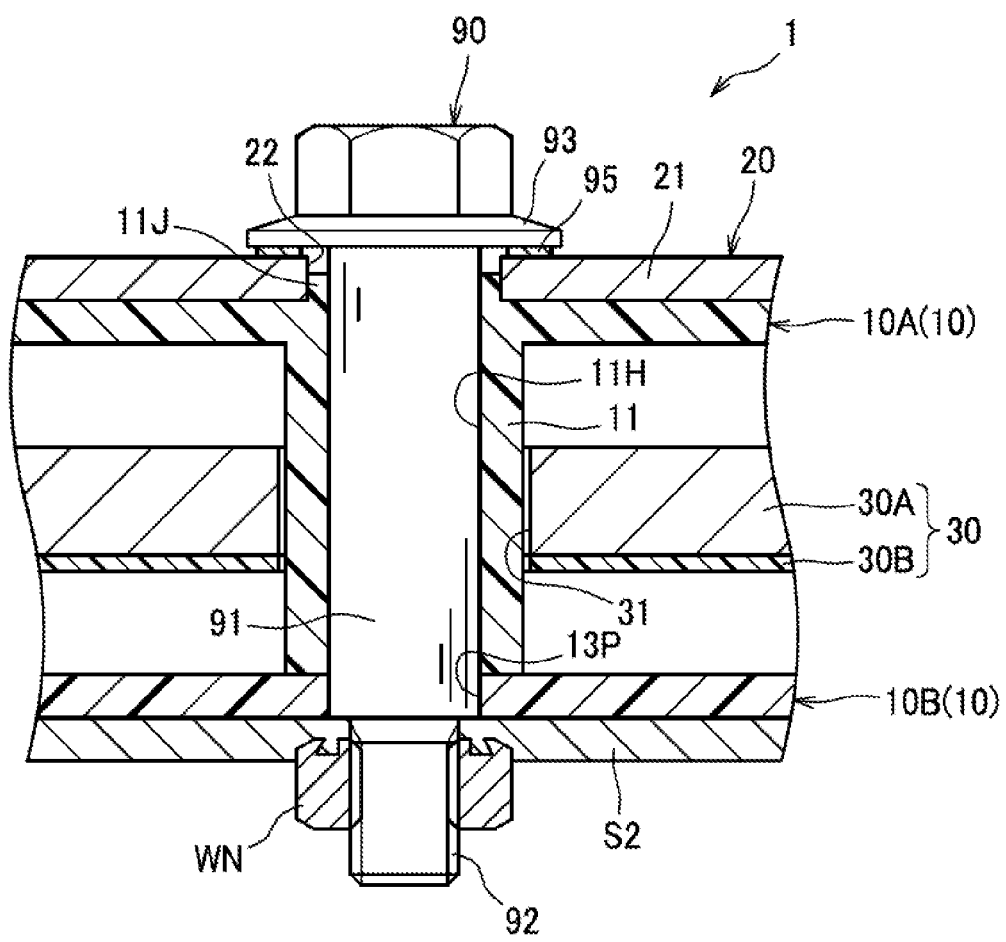
FIG. 7 is a sectional view explaining a structure for supporting a latch to allow rotation of the latch.
Figure 8:
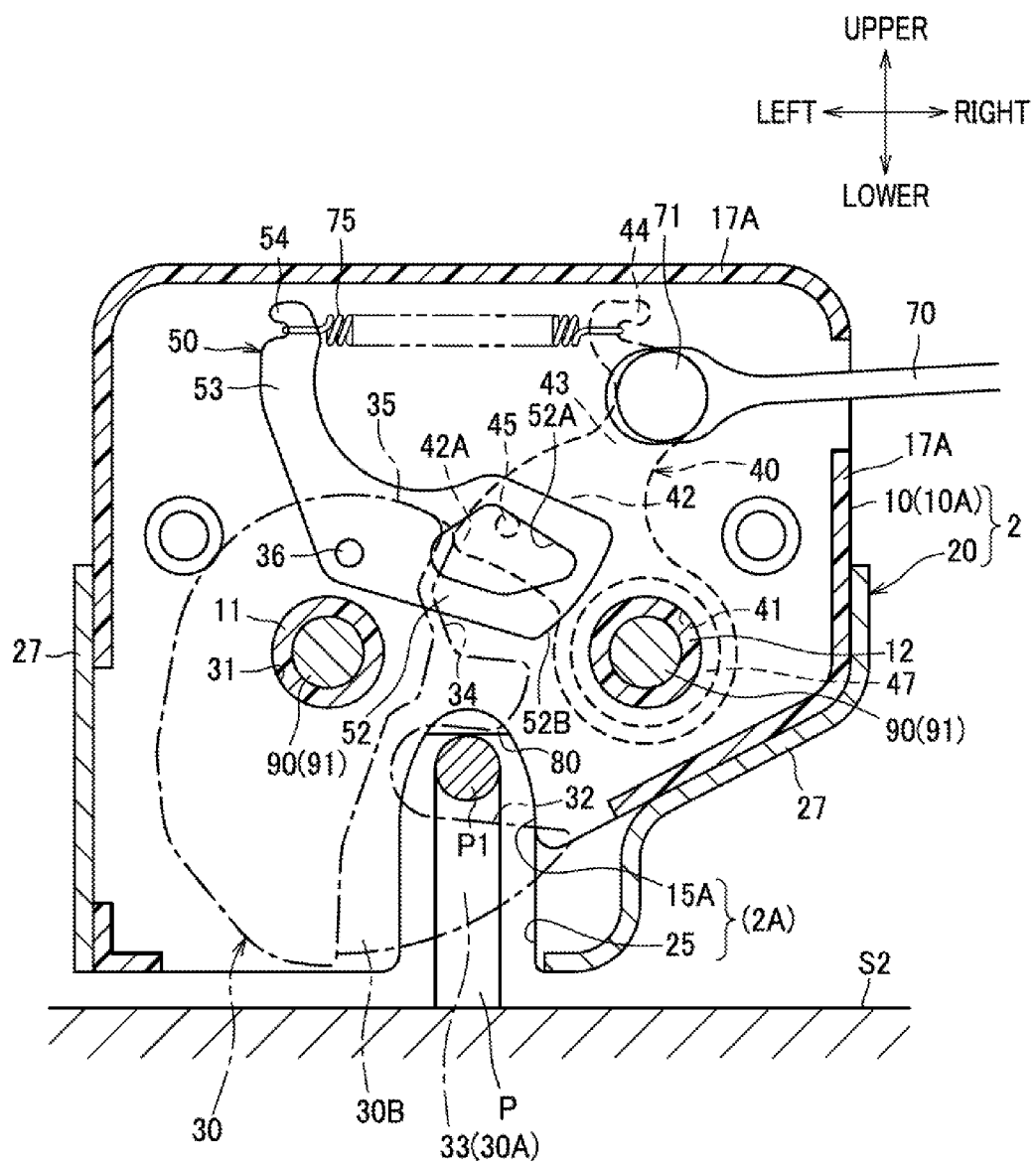
FIG. 8 is a view explaining the operation of the latching device with a rod being pulled out to some extent.

As seen in FIG. 7, the lower case 10A and the upper case 10B are fastened together by the bolts 90 and assembled into a box-like shape, and they are fixed to the bracket S2 together with the reinforcement plate 20. Each bolt 90 includes a shank 91, a thread portion 92 provided at the distal end of the shank 91, and a flanged head 93 provided at the proximal end of the shank 91. The shank 91 has a diameter greater than that of the ridge of the thread portion 92, and this large diameter stepped portion receives a fastening force of the bolt 90 when the bolt 90 is fastened to the weld nut WN. This configuration can reduce the cost as compared to the configuration in which a metal collar is employed instead of this shank 91 having a large diameter.

Various components such as the latch 30 are mounted inside the lower case 10A and the upper case 10B, and then the lower case 10A and the upper case 10B are closed into the box-like shape by mating the open side of the lower case 10A and the open side of the upper case 10B, in this assembly, the positioning projections 11J, 12J shown in FIG. 5(a) are fitted in the positioning holes 22, 23 of the reinforcement plate 20. By this way, the resinous casing 10 and the reinforcement plate 20 are positioned and assembled together. The latching device 1 assembled as described above is then fixed to the bracket S2 by the bolts 90 such that as seen in FIG. 7, the shank 91 of each bolt 90 is inserted into the bolt hole 11H and the thread portion 92 is screwed into the weld nut WN of the bracket S2. A spring washer 95 is inserted between the flanged head 93 and the reinforcement plate 20, so that the latching device 1 is held between the bracket S2 and the flanged head 93 by resilient force of the spring washer 95.

As clearly shown in FIG. 7, one of the walls of the casing 2, which are spaced apart in a direction of the axis of rotation of the latch 30, is formed by the resinous casing 10, whereas the outer side of the other wall is formed by the reinforcement plate 20. Further, the reinforcement plate 20 is located outside when the latching device 1 is attached to the frame S by the bolts 90, and serves as a bearing surface for receiving the fastening force of the bolt 90. By this configuration, since the reinforcement plate 20 is located outside, the reinforcement plate 20 can directly receive a force required for fastening the latching device 1 and the reinforcement plate 20 can protect the resinous casing 10 from an external impact. The fastened state of the first shaft 11 by the bolt 90 has been described above with reference to FIG. 7. However, the same can be said to the fastening of the second shaft 12 by the bolt 90. For this reason, a description will be omitted to the fastening of the second shaft 12.

Operation of the latching device 1 configured as described above will now be described.

Before actuation of the latching device 1 as shown in FIG. 6, the rod-like portion P1 of the striker P is located deeply at the bottom of the insertion groove 2A of the casing 2, and the hook-like portion 33 of the latch 30 holds the rod-like portion P1 from below. Further, the locking engagement portion 42A is located in the locking recess portion 34 of the latch 30 to restrict the rotation of the latch 30. In other words, the latch 30 is in the closed state and the latching device 1 is in the locked state. In this position, the extension spring 75 generates a pulling force, and the locking engagement portion 42A of the ratchet 40 is in contact with the bottom of the locking recess portion 34. The rod-like portion P1 of the striker P contacts with the load-receiving surface 89A of the load-receiving member 80, so that the load applied from the striker P to the latching device 1 is transmitted to the flange 28 of the reinforcement plate 20 through the load-receiving member 80 (see FIGS. 5(a) and (b)) and received by the reinforcement plate 20.

Figure 5:
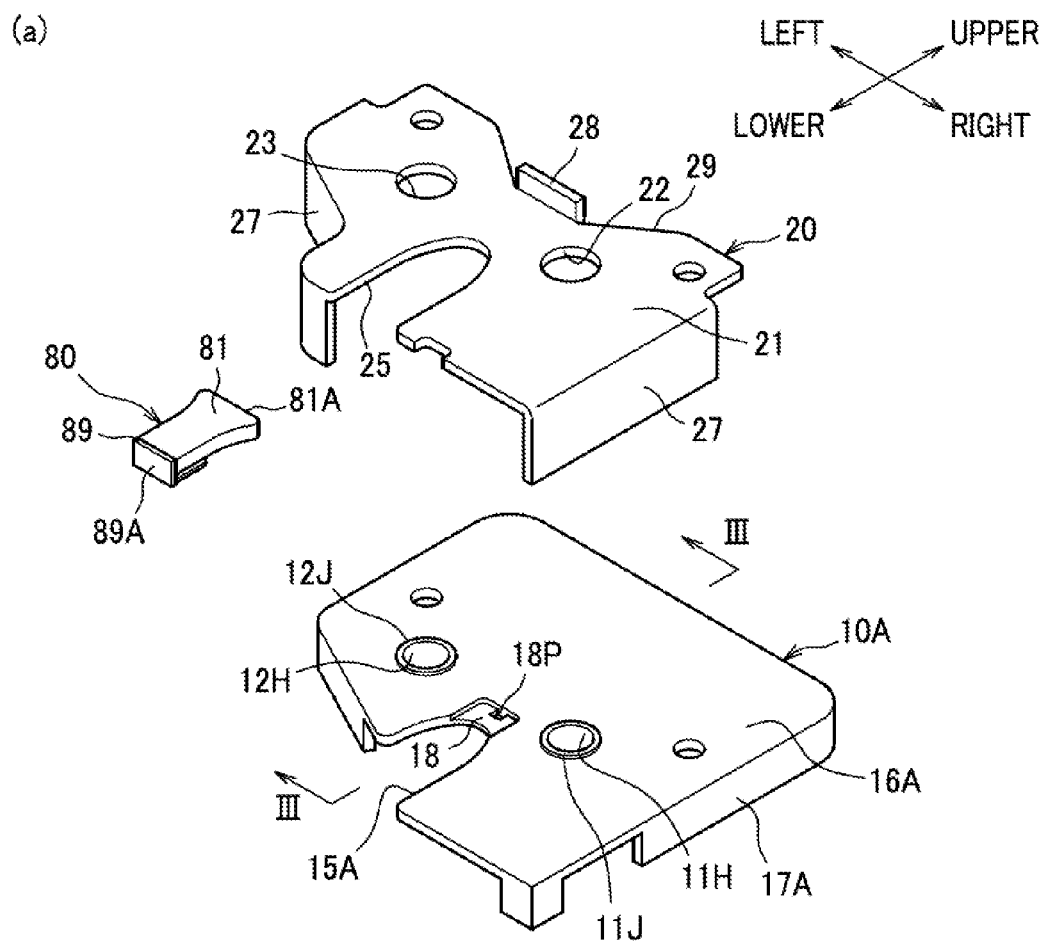
FIG. 5 includes (a) an exploded perspective view of the latching device showing the reinforcement plate, the lower case and the load-receiving member, and (b) a cross-sectional view of (a) taken along the line III-III of the assembly of these parts.
Figure 5:
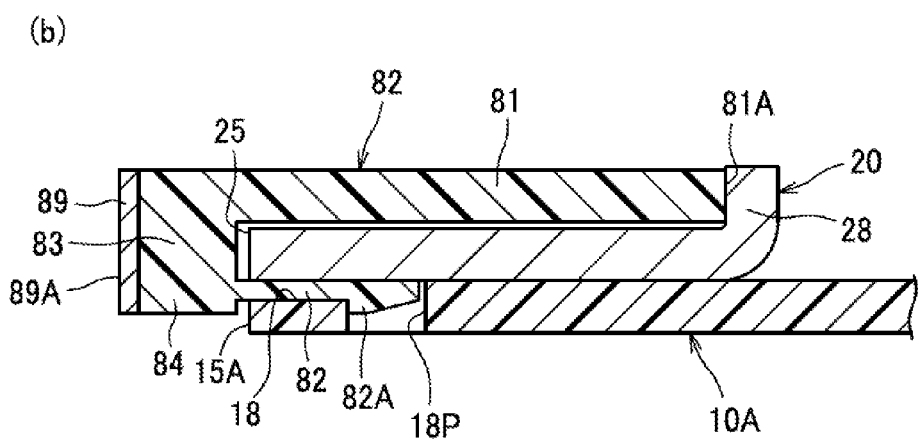

Pulling out the rod 70 from the pre-actuation state shown in FIG. 6, the latching device 1 operates as seen in FIG. 5 such that the ratchet 40 first rotates clockwise and the pin. 45 of the ratchet 40 pushes the upper right fringe of the guide hole 52A to thereby cause the lever member 50 to rotate in the anti-clockwise direction while extending the extension spring 75.

Although FIG. 5 shows little changes from the state shown in FIG. 6, the force applied to the lever member 50 is transmitted to the latch 30 through the pin 36, so that the latch 30 is about to rotate slightly in the clockwise direction.

Figure 9:
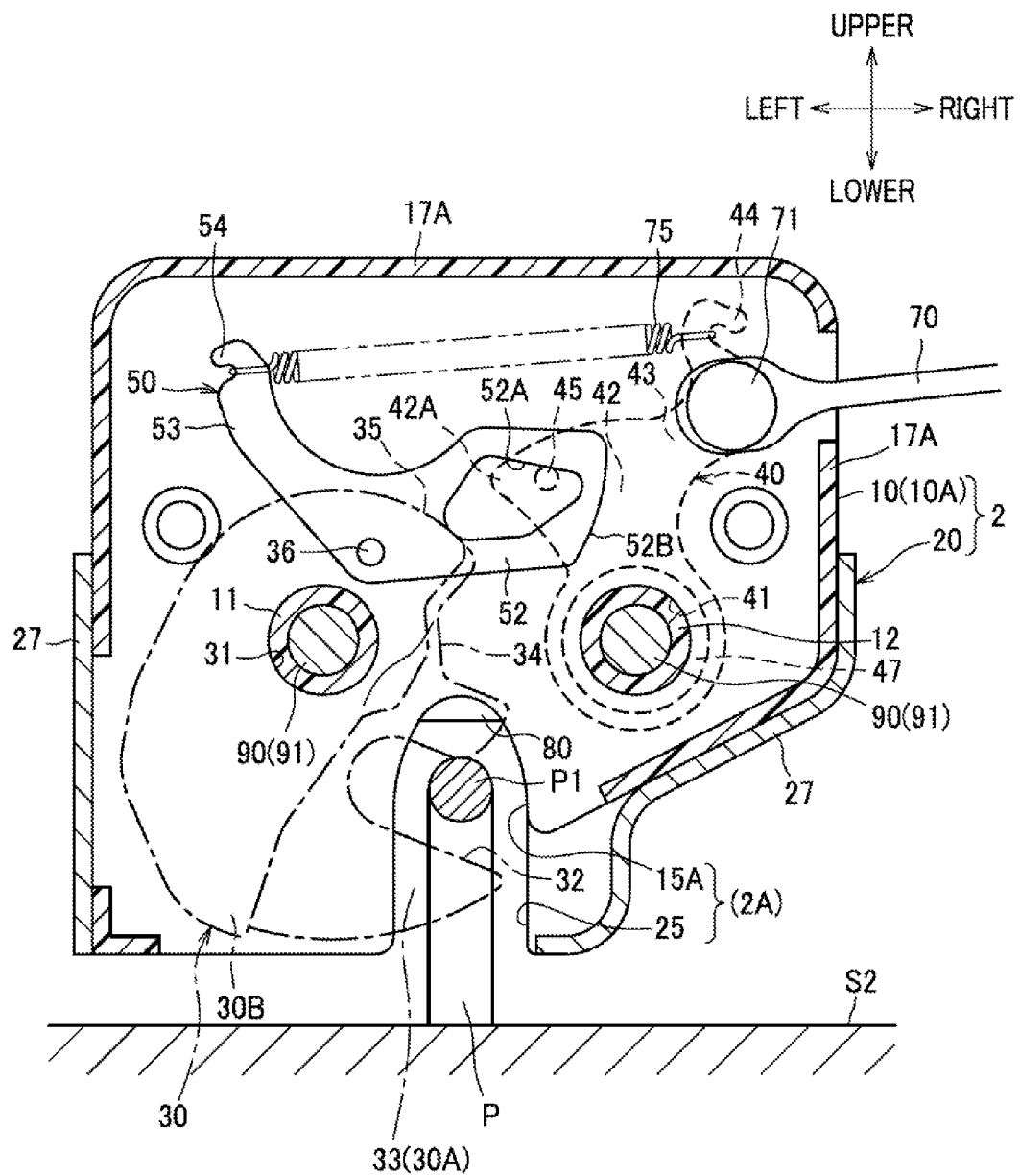
FIG. 9 is a view explaining the operation of the latching device with the rod being pulled out to a large extent.

When the rod 70 is pulled out further, as seen in FIG. 9, the ratchet 40 rotates further in the clockwise direction and the locking engagement portion 42A is completely disengaged from the locking recess portion 34. The latch 30 then rotates clockwise by the force applied from the lever member 50 through the pin 36, and the locking engagement portion 42A faces the open contact surface 35 of the latch 30.

Figure 10:
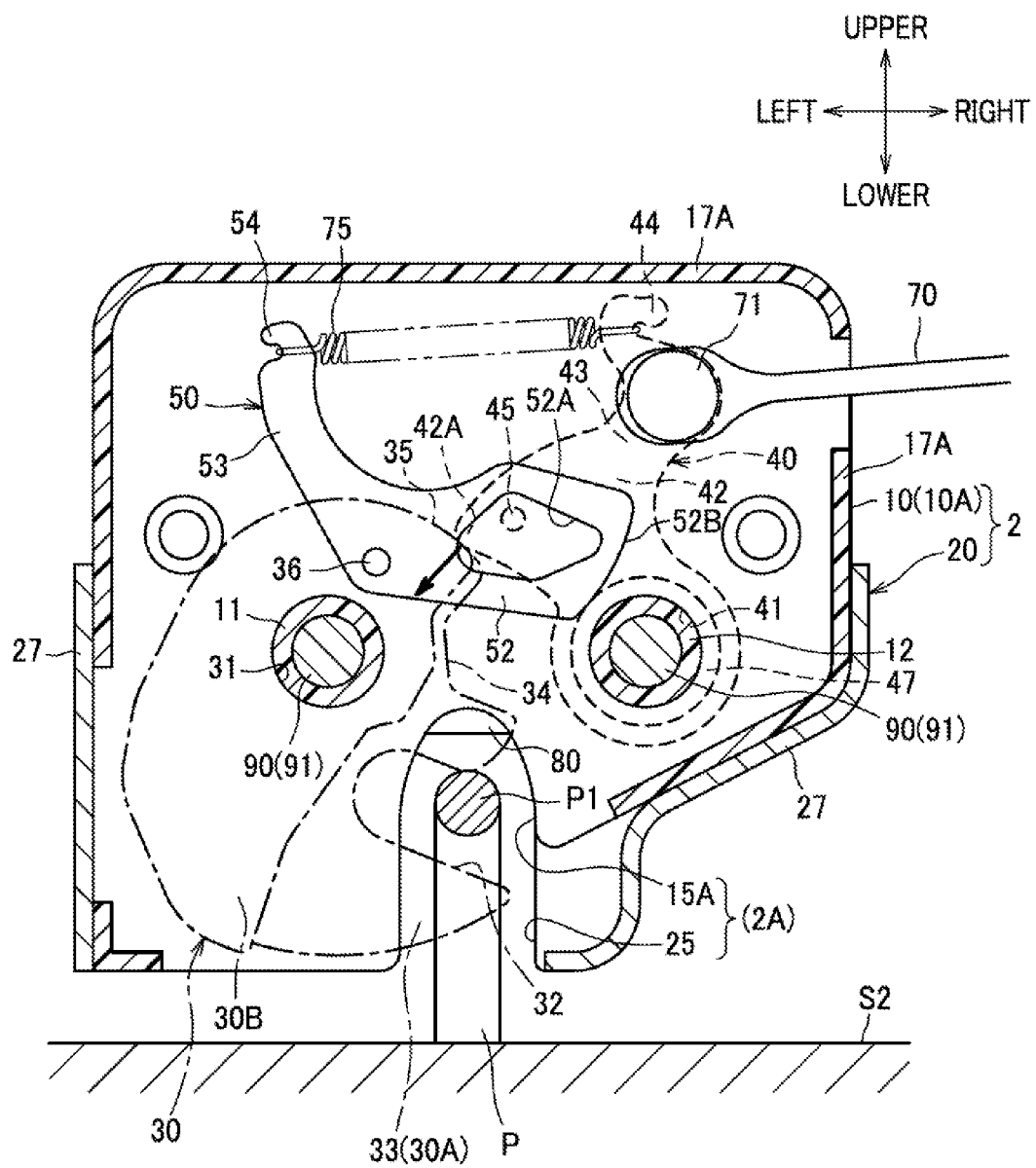
FIG. 10 is a view explaining the operation of the latching device with the rod returned to its original position and a ratchet being in contact with the latch.

Returning the rod 70 from the state shown in FIG. 9 by the action of the pulling force of the extension spring 75, as seen in FIG. 10, the locking engagement portion 42A of the ratchet 40 is brought into contact with the open contact surface 35 of the latch 30. As shown by the thick arrow in FIG. 10, the pushing force of the ratchet 40 for pushing the latch 30 is directed from the contacting point between the locking engagement portion 42A and the open contact surface 35 toward the center of curvature of the open contact surface 35. Since the center of curvature of the open contact surface 35 is shifted rightward from the rotation center of the latch 30 in the range of the open contact surface 35 where the locking engagement portion 42A contacts the open contact surface 35, the force applied from the ratchet 40 by the urging force of the extension spring 75 and pushing the latch 30 acts as a force (rotation moment) for causing the latch 30 to rotate in the clockwise direction, namely into the open state.

Figure 11:
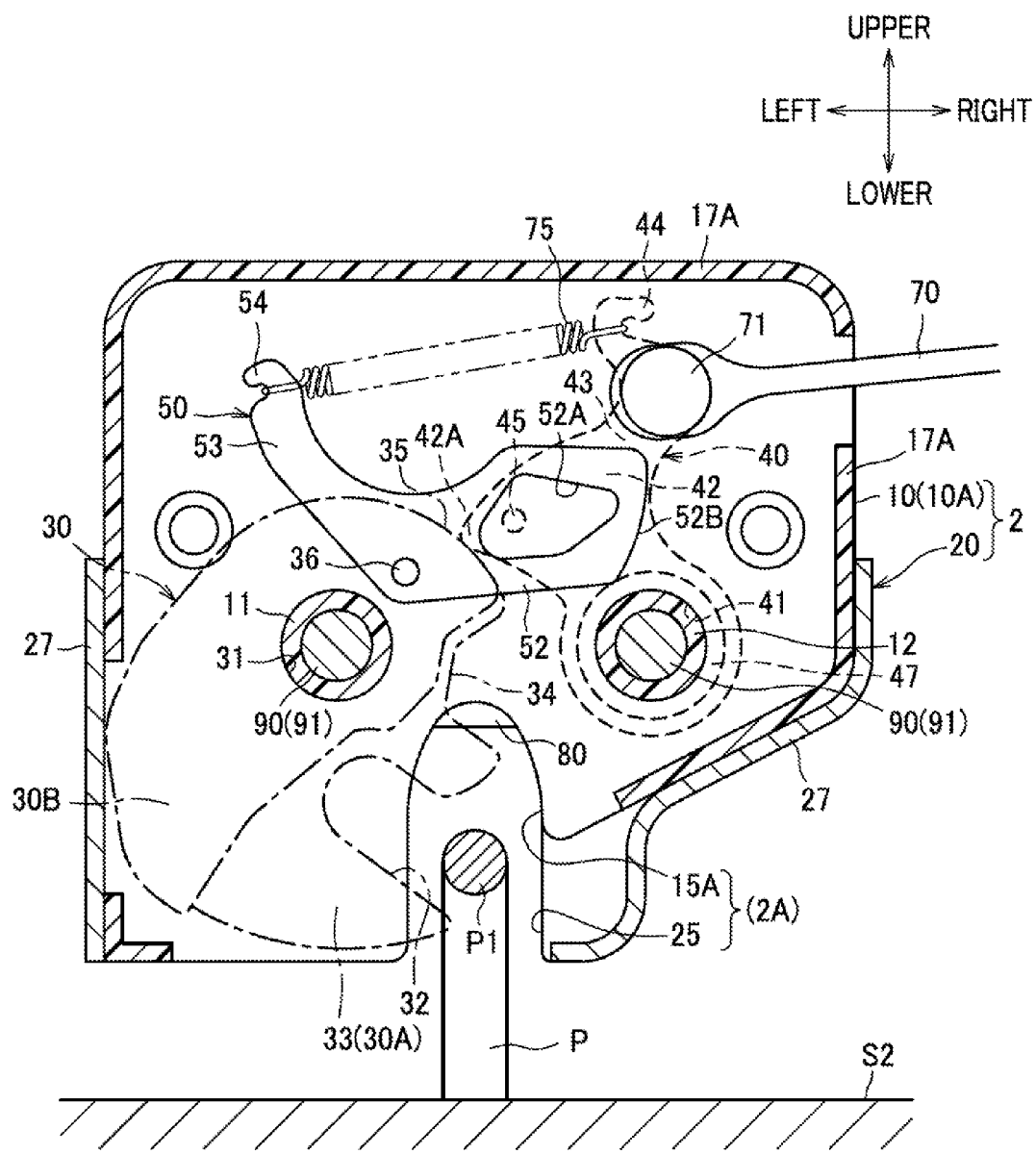
FIG. 11 is a view explaining the operation of the latching device in an unlocked state.

When the latch 30 rotates clockwise by this rotation moment while the open contact surface 35 sliding on the locking engagement portion 42A, the latch 30 moves into the open state as seen in FIG. 11, thereby allowing the rod-like portion P1 of the striker P to be disengaged from the insertion groove 2A. Namely, the latching device 1 is in the unlocked state.

In order to return the latching device 1 from the unlocked state to the locked state, the rod-like portion P1 of the striker P is inserted into the insertion groove 2A from the state shown in FIG. 11, pressed against the groove 32 of the latch 30, and moved further to rotate the latch 30 in the anticlockwise direction. By this operation, the locking engagement portion 42A remaining in contact with the open contact surface 35 slides on the open contact surface 35, and after a sufficient rotation of the latch 30, the locking engagement portion 42A enters the locking recess portion 34 by the urging force of the extension spring 75. Namely, the latching device 1 returns to the locked state shown in FIG. 6.

According to the latching device 1 of this embodiment, the latch 30, the ratchet 40 and the lever member 50 are rotatably supported by and received in the resinous casing 10, so that even if these parts rotate and contact the casing during the above-described operation, the generated sound will not become metallic sound and thus noise can be suppressed. Further, since sliding contact of the latch 30, the ratchet 40 and the lever member 50 relative to the resinous casing 10 does not involve metal-to-metal contact but metal-to-resin contact, a smooth operating feel can be obtained.

In particular, the latching device 1 according to this embodiment is configured such that the first shaft 11 and the second shaft 12 which are integral with the resinous casing 10 support the first hole 31 of the latch 30 and the second hole 41 of the ratchet 40, respectively. This can avoid metal-to-metal contact, eliminate metallic sound, and obtain a smooth operating feel. Further, since the first ribs 14P, 14Q, 14S, 14T and the second ribs 14R, 14U are formed on the inner surface of the resinous casing 10 along the rotation directions of the latch 30 and the ratchet 40, and the latch 30 and the ratchet 40 slide on these ribs within the resinous casing 10, an excellent operating feel can be obtained thanks to reduced operating noise of the latching device 1 and reduced sliding resistance. Further, since the resinous cover 30B covers the latch 30 at the side of the latch 30 on which the ratchet 40 slides, the metal-to-metal contact between the latch 30 and the ratchet 40 is avoided to suppress metallic sound, and a smooth operating feel can be obtained.

Further, since the resinous casing 10 has a smaller specific gravity than the conventional base made of a steel plate, the weight of the latching device 1 can be reduced. The above-described first shaft 11 and second shaft 12 are shaped as a circular tube to reduce the change in thickness of the resinous casing 10, and hence molding can be performed with increased accuracy. Further, the first shaft 11 and the second shaft 12 are hollow and hence poor in strength, but since the shank 91 of the bolt 90 is inserted into each of the first and second shafts 11, 12 to render the shank solid for reinforcement, sufficient rigidity of the first and second shafts 11, 12 can be ensured. Further, since the bolts 90 necessary for fastening the latching device 1 to the frame S as an example of another device are used as the parts for constituting the solid structure, the number of constituent parts can be decreased as compared to the configuration in which a separate part is used for reinforcement. This can lead to the cost reduction as well as the reduction in weight of the latching device 1.

If the lever member 50 made of metal is disposed at a position to directly contact the resinous shafts for supporting the latch 30 and the ratchet 40 in order to eliminate a play of the lever member 50, the shafts may wear out. However, in the latching device 1 according to this embodiment, since the flange 47 is provided to surround the second hole 41 of the ratchet 40 and the lever member 50 contacts the outer periphery of this flange 47, it is possible to prevent wear of the resinous shafts as well as to prevent a play of the lever member 50 so that an occurrence of unnecessary noise can be avoided.

Further, in the latching device 1 according to this embodiment, while the locking engagement portion 42A of the ratchet 40 is in contact with the open contact surface 35 of the latch 30, this contacting force acts to cause the latch 30 to rotate toward the open state. This can prevent the latch 30 from being stopped in an unexpected posture.

Further, since the reinforcement plate 20 constitutes the insertion groove 2A (25) for guiding the rod-like portion P1, wear of the insertion groove 2A by the operation of the latching device 1 can be suppressed, and the possible decrease in durability due to the use of the resinous casing 10 can be suppressed. The decreased rigidity of the casing 2 due to the use of the resinous casing 10 can be compensated by the reinforcement plate 20 for partly covering the resinous casing 10, and thus the necessary rigidity can be ensured.

Further, since the resinous casing 10 includes the lower case 10A and the upper case 10B which are connected by the hinge 19 and molded together, the lower case 10A and the upper case 10B can be molded at one time, which leads to reduction of the cost. Further, since the orientation of the lower case 10A and the upper case 10B is previously determined by the hinge 19, the assembly of the latching device 1 can be performed by installing the inner parts in order within the lower case 10A and then closing the upper case 10B without paying attention to the orientation of these cases 10A, 10B. This can lead to an excellent productivity.

Since the latching device 1 according to this embodiment includes the load-receiving member 80 made of resin, and the rod-like portion P1 of the striker P directly contacts the load-receiving member 80, the load from the striker P can be received gently by the load-receiving member 80 when locking the latching device 1, and an excellent operating feel can be obtained. Although the load-receiving member 80 engages with both of the reinforcement plate 20 and the resinous casing 10, the engagement claw 82 thereof engages with the engagement hole 18P formed in the resinous casing 10. Accordingly, it is not necessary to form the engagement hole 18P in the reinforcement plate 20 made of a steel plate, which is easy to manufacture. Further, as viewed from the axial direction of the first shaft 11, the load-receiving surface 89A of the load-receiving member 80 is located between the two bolts 90, at a center portion of the line segment connecting the centers of the bolts 90. Accordingly, a force received by the load-receiving surface 89A is supported in good balance by the two bolts 90, with the result that an unnecessary rotation moment can be prevented from occurring in the latching device 1.

Further, the latching device 1 according to this embodiment includes the positioning projections 11J, 12J provided on the resinous casing 10 and the positioning holes 22, 23 of the reinforcement plate 20, which are engageable with each other for positioning, and the positioning projections 11J, 12J are provided at the fringes of the holes through which the bolts 90 pass. This can provide a simple configuration as compared to the configuration in which positioning projections and corresponding holes are provided in other positions, and the positioning projections 11J, 12J and the positioning holes 22, 23 can be engaged with each other without fail.

Further, since the flange 28 of the reinforcement plate 20 is provided at the recess portion 29 of the contour of the reinforcement plate 20 as viewed from the axial direction of the first shaft 11, the reinforcement plate 20 can be downsized and an efficient cutting layout for the reinforcement plate 20 can be achieved. Further, since the reinforcement plate 20 is located outside when the latching device 1 is attached to the frame S, the reinforcement plate 20 can directly receive a force required for fastening the latching device 1 and the reinforcement plate 20 can protect the resinous casing 10 from an external impact.

Next, with reference to FIGS. 12 to 15, a description will be given of a latching device for vehicles according to a modified embodiment. Structural parts similar to those previously described in the above-described embodiment are denoted by the same reference numerals and a detailed description thereof will be omitted.

Figure 12:
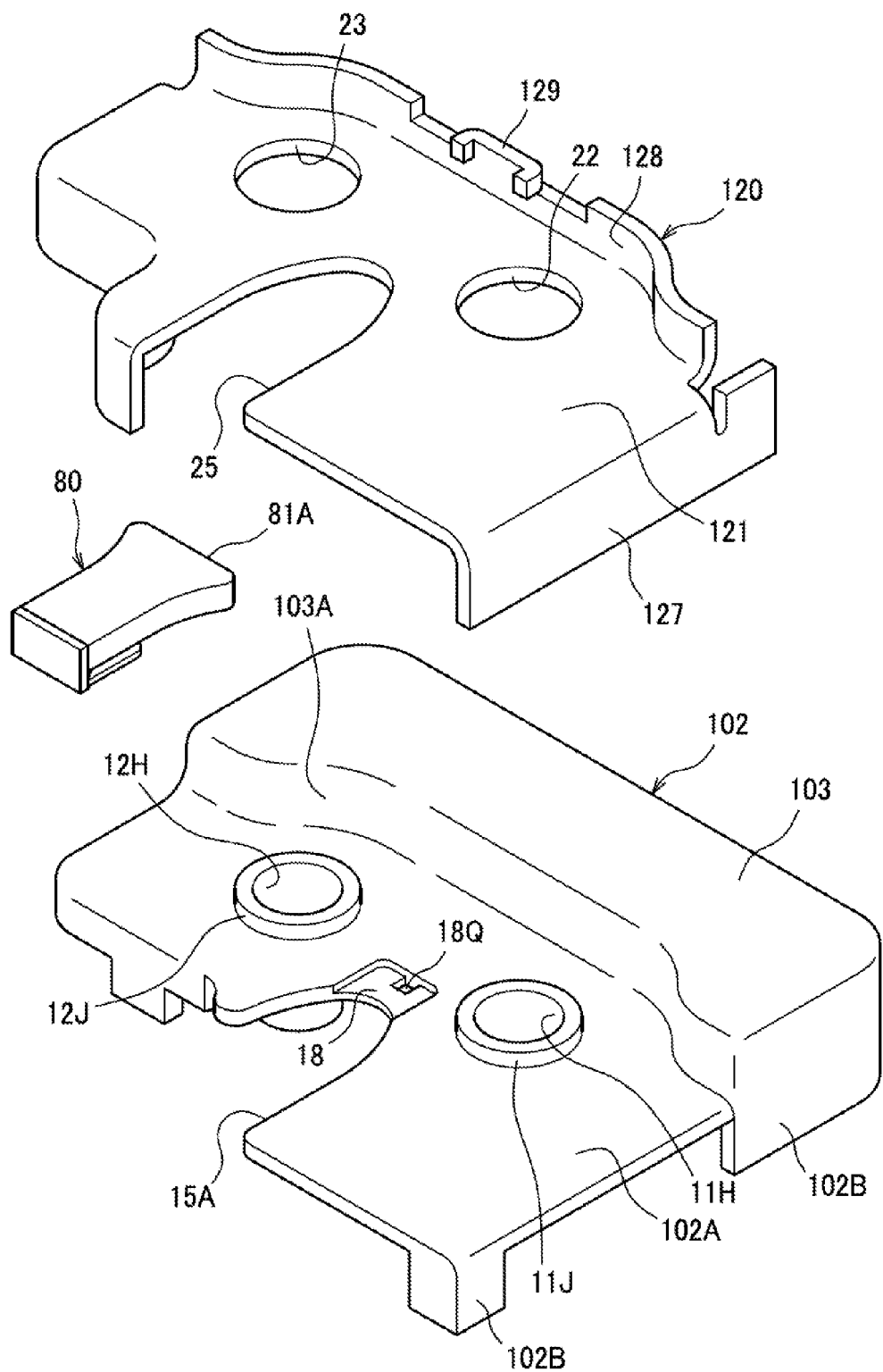
FIG. 12 is an exploded perspective view of the reinforcement plate, the lower case and the load-receiving member according to a modified embodiment.

The lower case 102 shown in FIG. 12 includes a raised portion 103 which bulges outward from the base portion 102A. The raised portion 103 has a wall surface which forms a stepped portion from the base portion 102A, and die wall surface curves to avoid the positioning projections 11J, 12J and provides a curved surface 103A.

Provided at the upper end portion of the recess portion 18 is an engagement hole 18Q in the shape of a recess instead of a through-opening. The lower case 102 is made of resin as an example of the first material.

Figure 13:
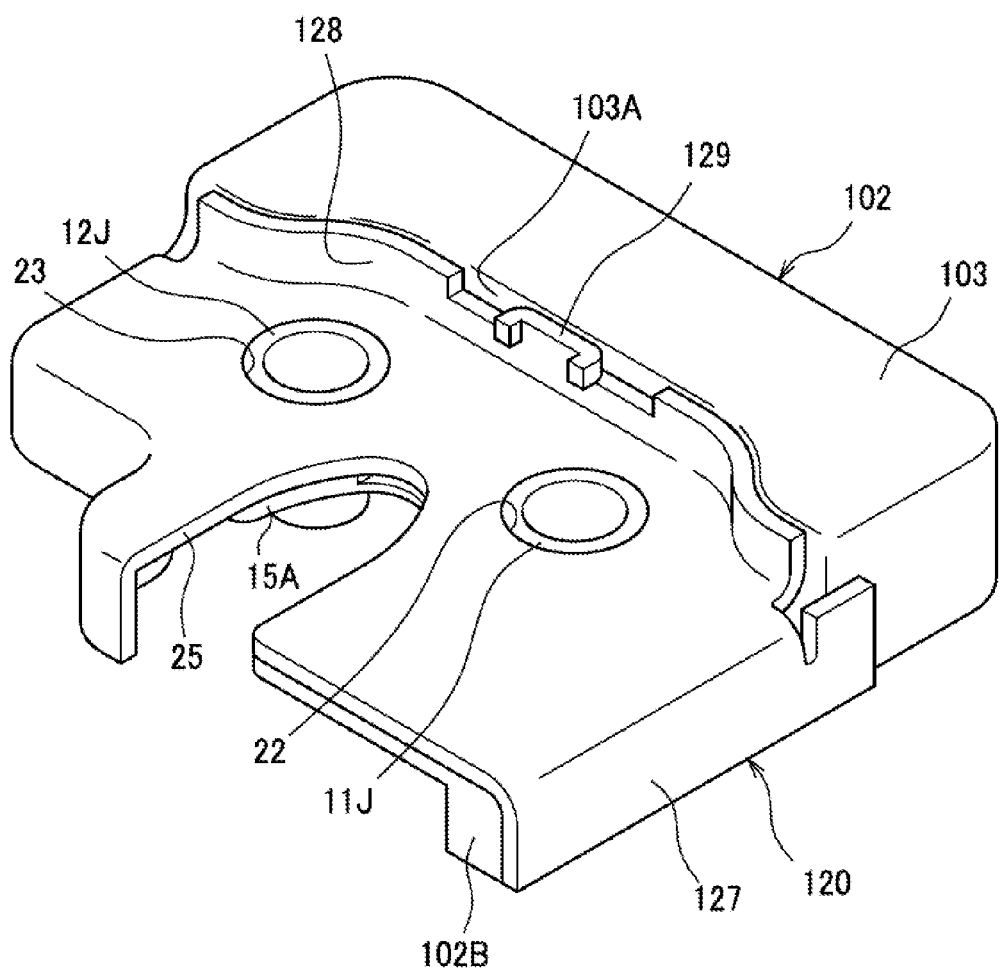
FIG. 13 is a perspective view showing a state in which the reinforcement plate and the lower case shown in FIG. 12 are assembled together.

As seen in FIGS. 12 and 13, the reinforcement plate 120 is formed to surround substantially all the external region of the lower case 102 except the raised portion 103. The reinforcement plate 120 is made by press working of a sheet metal that is an example of the second material having a higher specific gravity and a higher modulus of elasticity than resin; the reinforcement plate 120 includes a flat-plate-shaped base portion 121, side wall portions 127 provided by partly rising inward at the outer edges of the base portion 121, and a flange 128 rising from the base portion 121 along the curved surface 103A of the raised portion 103. The flange 128 has a contact portion 129 at the center portion thereof, and the end face 81A of the load-receiving member 80 is brought into contact with the contact portion 129.

Figure 14:
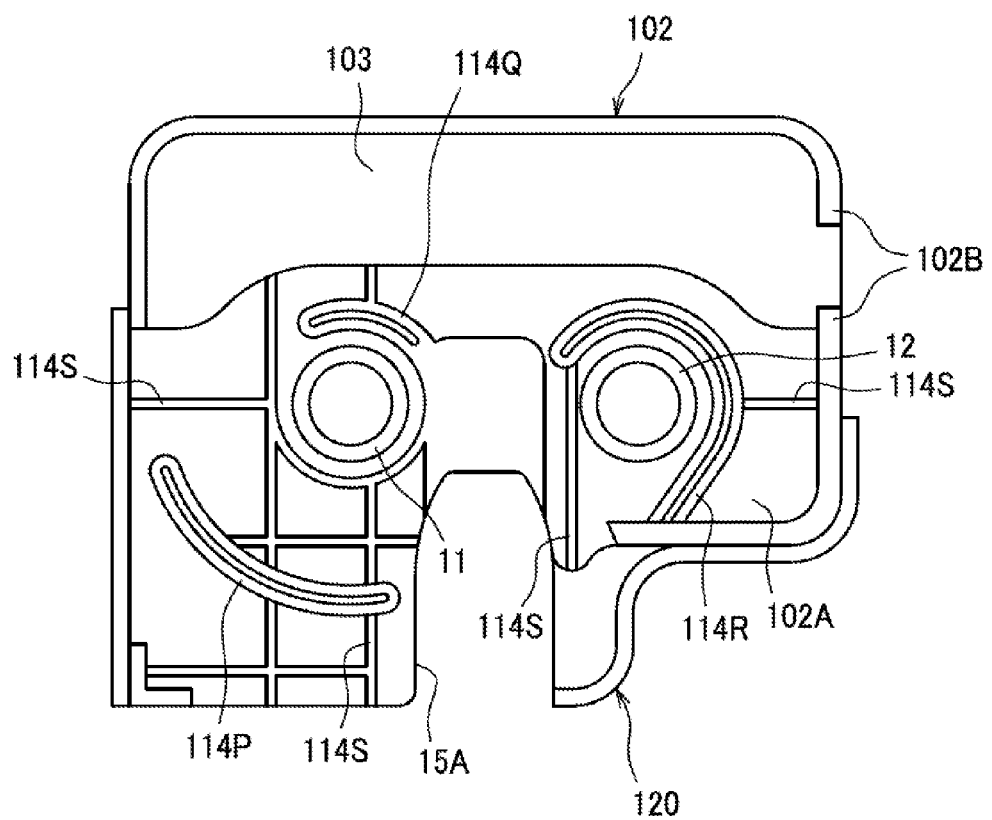
FIG. 14 is a top view of the reinforcement plate and the lower case as viewed from inside.

As seen in FIGS. 13 and 14, the side wall portions 127 of the reinforcement plate 120 are engageable with the side wall portions 102B of the lower case 102 so that they can be temporarily assembled together.

Figure 15:
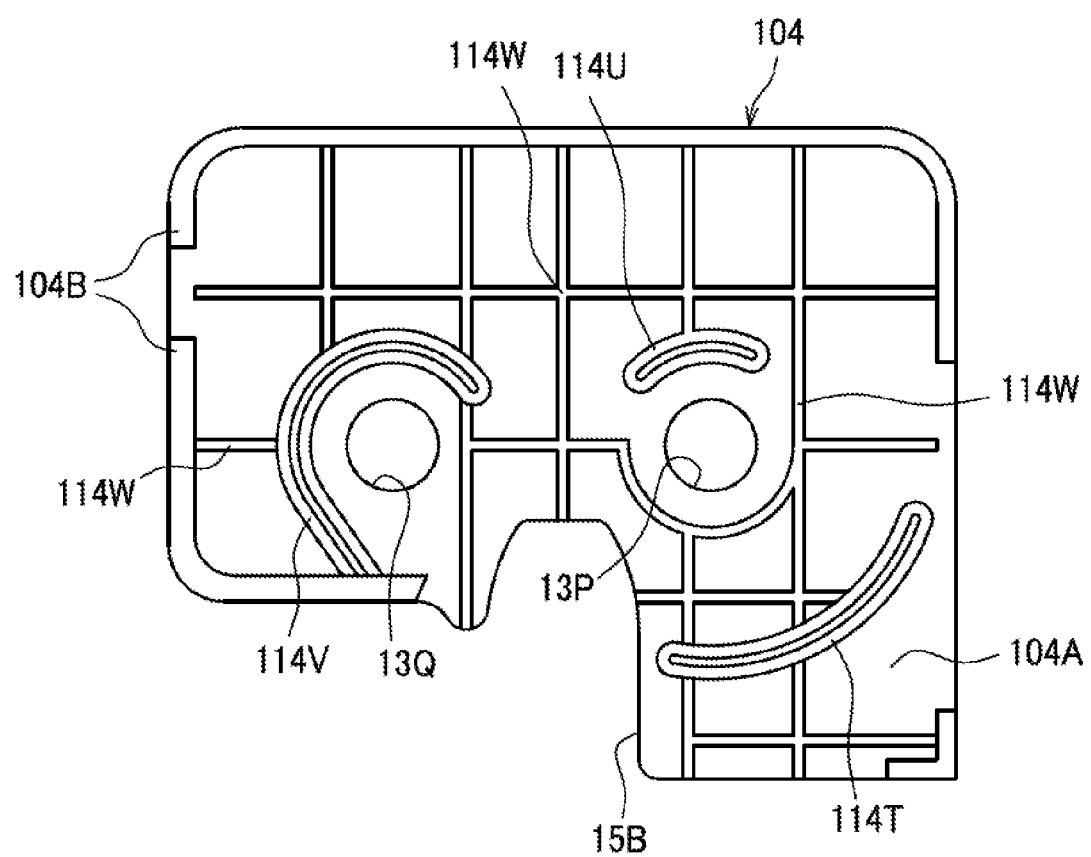
FIG. 15 is a top vie of the upper case as viewed from inside.

As seen in FIG. 15, the upper case 104 is formed as a separate and discrete member from the lower case 102. The upper case 104 is substantially the same and symmetrical with the lower case 102, except that the upper case 104 does not have the raised portion 103, the first shaft 11 and the second shaft 12. The upper case 104 is made of resin as an example of the first material.

As seen in FIG. 14, two first ribs 114P, 114Q are formed around the first shaft 11 provided on the inner surface of the lower case 102; each first rib 114P, 114Q is shaped as a circular arc coaxial with the first shaft 11 and protrudes from the inner surface of the base portion 102A. Provided on the inner surface of the base portion 102A around the second shaft 12 is a second rib 114R having one end connected to the side wall portion 102B and the other end shaped as a circular arc coaxial with the second shaft 12.

Further, third ribs 114S are provided on the inner surface of the base portion 102A except the region surrounded by the raised portion 103.

At a half side of the base portion 102A where the first ribs 114P, 114Q are provided, the third ribs 114S extend lengthwise and crosswise to form a grid-like pattern. On the other hand, at the other half side of the base portion 102A where the second rib 114R is provided, the third ribs 114S extend lengthwise and crosswise from the second rib 114R. The third ribs 114S are connected to the side wall portion 102B, the raised portion 103, the first ribs 114P, 114Q and the second rib 114R, and extend in the entire inner region of the base portion 102A except the region surrounded by the raised portion 103, so that the rigidity of the lower case 102 can be enhanced.

The first rib 114P is formed at a position corresponding to the rotation range of the latch 30.

The first rib 114Q is formed at a position corresponding to the rotation range of the lever member 50.

The second rib 114R is formed at a position corresponding to the rotation range of the ratchet 40.

The first rib 114P and the second rib 114R have the same height. The first rib 114P is contacted by the latch 30, and the second rib 114R is contacted by the ratchet 40. The third rib 114S has the same height as the first rib 114Q. Further, the first rib 114P and the second rib 114R are higher than the third rib 114S. For this reason, the latch 30 can slidably contact the first rib 114P and the ratchet 40 can slidably contact the second rib 114R without contacting the third ribs 114S, with the result that the latch 30 and the ratchet 40 can rotate smoothly. As seen in FIGS. 6, 8-11, since the lever member 50 is operated while it is placed over the latch 30 and the ratchet 40, the lever member 50 does not contact the first rib 114Q and hence the first rib 114Q, together with the third ribs 114S, serves to enhance the rigidity of the resinous casing.

As seen in FIG. 15, the upper case 104 includes side wall portions 104B provided by partly rising inward at the outer edges of the base portion 104A.

Provided on the base portion 104A around the bolt hole 13P are two first ribs 114T, 114U which are arranged in symmetrical positions of the first ribs 114P, 114Q formed on the lower case 102. Further, provided on the base portion 104A around the bolt hole 13Q is a second rib 114V which is arranged in a symmetrical position of the second rib 114R.

Further, at the entire inner surface of the base portion 104A there are provided third ribs 114W which extend lengthwise and crosswise to form a grid-like pattern. With this configuration, the rigidity of the upper case 104 can be enhanced.

The first rib 114T has a height enough to contact with the latch 30 and is formed at a position corresponding to the rotation range of the latch 30. The second rib 114V has a height enough to contact with the ratchet 40 and is formed at a position corresponding to the rotation range of the ratchet 40. The first rib 114T and the second rib 114V have the same height.

The first rib 114U has the height in contact with the lever member 50 which is engageable with the latch 30, and is formed at a position corresponding to the rotation range of the lever member 50. The first rib 114U has the same height as the third rib 114W.

When assembling the latching device configured as described above, various components including the latch 30, the ratchet 40 and the lever member 50 are installed in the lower case 102, and then the lower case 102 and the upper case 104 are adhered together into the box-shaped resinous casing. Thereafter, the positioning projections 11J, 12J are fitted into the positioning holes 22, 23 of the reinforcement plate 120, and the resinous casing and the reinforcement plate 120 are combined together with the flange 128 of the reinforcement plate 120 being in contact with the curved surface 103A of the raised portion 103 of the case 102. Further, the load-receiving member 80 is inserted into the insertion groove 25 of the reinforcement plate 120 until the end face 81A of the load-receiving member 80 is brought into contact with the contact portion 129 of the flange 128. The thus completed assembly is fixed to the bracket S2 (see FIG. 1) by the bolts 90.

The latching device configured as described above in this modified embodiment operates similarly to the above-described latching device 1.

In the above-described latching device according to the modified embodiment, the advantageous effects similar to those observed in the above-described latching device 1 can be obtained.

Further, since the lower case 102 includes the raised portion 103, the rigidity of the resinous casing can be enhanced.

Further, the first ribs 114Q, 114U formed on the inner surface of the resinous casing are shorter than the other first ribs 114P, 114T and the second ribs 114R, 114V. Accordingly, the size of the first ribs 114Q, 114U can be reduced in accordance with the required rigidity of the resinous casing, so that the weight of the resinous casing can be reduced.

Although one embodiment of the present invention have been described above, the present invention is not limited to the above-described embodiment and various changes and modifications may be made without departing, from the appended claims.

For example, the casing may consist of the resinous casing without including the reinforcement plate 20, 120. In this example, the hook-like portion 33 of the latch 30 can be construed as the second member configured to contact the rod-like portion P1 of the striker P.

For example, in the above embodiment, the shafts for supporting the latch 30 and the ratchet 40 are integral with the resinous casing. However, these shafts may be made of metal. Further, a resinous shaft may be used for one of the latch 30 and the ratchet 40.

In the above embodiment, one specific fixing structure for the latching device 1 using two bolts 90 has been described. However, the fixing structure is not limited to this exemplified embodiment. For example, the fixing member may be a rivet instead of the bolt, and the fixing member may fix the latching device at a portion other than the resinous shaft as exemplified in the above embodiment.

In the above embodiment, both of the lower case 10A and the upper case 10B are shaped like a tray. However, one may be formed in the shape of a tray, while the other may be formed in the shape of a flat-plate.

In the above embodiment, the first material is resin and the second material is steel material. However, this is merely an example, and for example, the first material may be aluminum alloy.

In the above embodiment, the insertion groove 2A (15A, 15B, 25) for guiding the rod-like portion P1 is formed in each of the resinous casing and the reinforcement plate. However, the insertion groove may be formed only in the reinforcement plate 20, 120.

Further, the latching device 1 is not limited to the use with the seat back of the vehicle seat such as a car, but may be provided on the seat bottom or a leg of the vehicle seat. Further, the latching device 1 may be used as a locking device for locking and unlocking an openable member such as a trunk of the car. The vehicle seat is not limited to a car seat, and may be a seat for a ship or a seat for an airplane.

The invention claimed is:

1. A latching device for vehicles capable of engaging with and disengaging from a rod-like portion to lock and unlock the latching device, the latching device comprising:
    a casing at least partly formed by a first member made of a first material and having an insertion groove for allowing the rod-like portion to be inserted thereinto;
    a second member made of a second material and configured to contact the rod-like portion; and
    a latch received in and rotatably supported by the casing and having a hook-like portion engageable with the rod-like portion,
    wherein the second material has a higher specific gravity and a higher modulus of elasticity than the first material,
    the hook-like portion of the latch is made of the second material,
    the first material is resin and the first member forms a resinous casing,
    the second material is metal,
    the resinous casing has an integrally-formed first shaft which protrudes inward of the resinous casing, and wherein the latch has a first hole through which the latch is fitted onto the first shaft, and the latch is rotatably supported by the resinous casing by an engagement of the first shaft and the first hole, and
    the first shaft is shaped as a circular tube, and wherein the latching device further comprises a first fixing member made of metal and configured to penetrate through an inner region of a tube of the first shaft and fix the latching device to another device.

2. The latching device for vehicles according to claim 1, wherein the second member forms a reinforcement plate configured to reinforce the resinous casing.

3. The latching device for vehicles according to claim 2, wherein the casing comprises the resinous casing and the reinforcement plate, and the insertion groove is formed in the reinforcement plate.

4. The latching device for vehicles according to claim 2, further comprising a resinous load-receiving member having a load-receiving portion configured to receive a load from the rod-like portion, wherein the resinous casing has an engagement hole engageable with the load-receiving member, wherein the reinforcement plate is made of sheet metal and has a support portion configured to support a force applied from the rod-like portion and received by the load-receiving member, and wherein the load-receiving member is configured to hold the reinforcement plate and has an engagement projection engageable with the engagement hole of the resinous casing.

5. The latching device for vehicles according to claim 4, wherein the support portion is provided at a recess portion of a contour of the reinforcement plate.

6. The latching device for vehicles according to claim 1, wherein the first member constitutes a wall of the casing located at one side in a direction of an axis of rotation of the latch, and the second member constitutes at least an outer side of a wall of the casing located at the other side, and wherein the second member is located outside when the latching device is attached to another device by a fixing member, and serves as a bearing surface for receiving a fixing force of the fixing member.

7. The latching device for vehicles according to claim 1, wherein the resinous casing is formed as a box-like shape by assembling two members together, and the two members are molded together with a hinge connecting the two members.

8. The latching device for vehicles according to claim 1, wherein the resinous casing has a first rib provided around the first shaft and protruding inward of the resinous casing.

9. The latching device for vehicles according to claim 1, further comprising a metal ratchet received in and rotatably supported by the resinous casing and configured to engage with the latch to maintain a closed state in which the latch is engageable with the rod-like portion and an open state in which the latch is disengageable from the rod-like portion, wherein the resinous casing has an integrally-formed second shaft which protrudes inward of the resinous casing, and wherein the ratchet has a second hole through which the ratchet is fitted onto the second shaft, and the ratchet is rotatably supported by the resinous casing by an engagement of the second shaft and the second hole, and wherein the second shaft is shaped as a circular tube, and wherein the latching device further comprises a second fixing member made of metal and configured to penetrate through an inner region of a tube of the second shaft and fix the latching device to another device.

10. The latching device for vehicles according to claim 9, wherein as viewed from a direction in which a load is applied from the rod-like portion, a load-receiving portion configured to receive a load from the rod-like portion is provided between the first fixing member and the second fixing member.

11. The latching device for vehicles according to claim 9, wherein the second member forms a reinforcement plate configured to reinforce the resinous casing.

12. The latching device for vehicles according to claim 11, wherein the resinous casing has holes for allowing the first fixing member and the second fixing member to penetrate therethrough, and a fringe of each hole is provided with a positioning projection extending outward from the resinous casing, and wherein the reinforcement plate has positioning holes fitted onto the corresponding positioning projections.

13. The latching device for vehicles according to claim 9, wherein the resinous casing is formed as a box-like shape by assembling two members together, and the two members are molded together with a hinge connecting the two members.

14. A latching device for vehicles capable of engaging with and disengaging from a rod-like portion to lock and unlock the latching device, the latching device comprising:
a casing at least partly formed by a first member made of a first material and having an insertion groove for allowing the rod-like portion to be inserted thereinto;
a second member made of a second material and configured to contact the rod-like portion;
a latch received in and rotatably supported by the casing and having a hook-like portion engageable with the rod-like portion,
wherein the second material has a higher specific gravity and a higher modulus of elasticity than the first material,
the hook-like portion of the latch is made of the second material,
the first material is resin and the first member forms a resinous casing, and
the second material is metal; and
a metal ratchet received in and rotatably supported by the resinous casing and configured to engage with the latch to maintain a closed state in which the latch is engageable with the rod-like portion and an open state in which the latch is disengageable from the rod-like portion,
wherein the resinous casing has an integrally-formed second shaft which protrudes inward of the resinous casing, and wherein the ratchet has a second hole through which the ratchet is fitted onto the second shaft, and the ratchet is rotatably supported by the resinous casing by an engagement of the second shaft and the second hole,
wherein the second shaft is shaped as a circular tube, and wherein the latching device further comprises a second fixing member made of metal and configured to penetrate through an inner region of a tube of the second shaft and fix the latching device to another device.

15. The latching device for vehicles according to claim 14, wherein the resinous casing is formed as a box-like shape by assembling two members together, and the two members are molded together with a hinge connecting the two members.

16. A latching device for vehicles capable of engaging with and disengaging from a rod-like portion to lock and unlock the latching device, the latching device comprising:
a casing at least partly formed by a first member made of a first material and having an insertion groove for allowing the rod-like portion to be inserted thereinto;
a second member made of a second material and configured to contact the rod-like portion;
a latch received in and rotatably supported by the casing and having a hook-like portion engageable with the rod-like portion,
wherein the second material has a higher specific gravity and a higher modulus of elasticity than the first material,
the hook-like portion of the latch is made of the second material,
the first material is resin and the first member forms a resinous casing, and
the second material is metal;
a metal ratchet received in and rotatably supported by the resinous casing and configured to engage with the latch to maintain a closed state in which the latch is engageable with the rod-like portion and an open state in which the latch is disengageable from the rod-like portion;
a lever member made of metal and rotatably supported by the latch and configured to engage with the ratchet to transmit a motion of the ratchet to the latch; and
an urging member configured to engage with the lever member and with the ratchet,
wherein the resinous casing has an integrally-formed second shaft which protrudes inward of the resinous casing, wherein the ratchet has a second hole through which the ratchet is fitted onto the second shaft, and a flange provided around the second hole and protruding in an axial direction of the second hole, wherein the ratchet is rotatably supported by the resinous casing by an engagement of the second shaft and the second hole, and wherein the lever member is urged by an urging force of the urging member and contacts the flange when the latch is in the closed state.

17. The latching device for vehicles according to claim 16, wherein the resinous casing is formed as a box-like shape by assembling two members together, and the two members are molded together with a hinge connecting the two members.

* * * * *